US011206380B2

(12) United States Patent
Arntsen et al.

(10) Patent No.: US 11,206,380 B2
(45) Date of Patent: Dec. 21, 2021

(54) PROJECTOR CONTROLLER AND ASSOCIATED METHOD

(71) Applicant: Dolby Laboratories Licensing Corporation, San Francisco, CA (US)

(72) Inventors: John Frederick Arntsen, Mill Valley, CA (US); Juan P. Pertierra, Fishers, IN (US); Martin J. Richards, Gig Harbor, WA (US); Barret Lippey, Foster City, CA (US); Christopher John Orlick, Furlong, PA (US); Douglas J. Gorny, Pacifica, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/055,959

(22) PCT Filed: May 14, 2019

(86) PCT No.: PCT/US2019/032293
§ 371 (c)(1),
(2) Date: Nov. 16, 2020

(87) PCT Pub. No.: WO2019/222270
PCT Pub. Date: Nov. 21, 2019

(65) Prior Publication Data
US 2021/0211624 A1 Jul. 8, 2021

Related U.S. Application Data

(60) Provisional application No. 62/672,288, filed on May 16, 2018.

(51) Int. Cl.
*H04N 9/31* (2006.01)

(52) U.S. Cl.
CPC ......... *H04N 9/3194* (2013.01); *H04N 9/3129* (2013.01); *H04N 9/3161* (2013.01)

(58) Field of Classification Search
CPC ......... A63J 25/00; H04R 1/025; H04R 1/028; H04R 1/403; H04R 2499/15; H04R 3/12;
(Continued)

(56) References Cited

U.S. PATENT DOCUMENTS 6,002,505 A   12/1999 Kraenert
6,460,999 B1  10/2002 Suzuki
(Continued)

FOREIGN PATENT DOCUMENTS

WO   2012173851 A2   12/2012

OTHER PUBLICATIONS

"DP2K CLP Series Safety and Environmental Information:" Oct. 18, 2016, multimedia Projectors, p. 7-9.
(Continued)

*Primary Examiner* — William C. Dowling

(57) ABSTRACT

A projector controller includes an object detector and control electronics, and is configured to protect audience members from intense light imposing an exclusion zone in front of a projector. The object detector is configured to optically sense a presence of an object in a detection region beneath the exclusion zone and above the audience members. The control electronics is configured to control the projector when the object detector indicates the presence of the object in the detection region. A method for protecting audience members from intense light imposing an exclusion zone in front of an output of a projector includes: (i) optically sensing a presence of an object in a detection region between the exclusion zone and the audience members, and (ii) controlling the projector when the presence of the object is sensed in the detection region.

23 Claims, 16 Drawing Sheets

(58) Field of Classification Search
CPC ......... G09G 2320/0626; G02B 5/0278; H04N 9/3194; H04N 9/3161; H04N 9/3129
USPC .................................................... 352/40, 41
See application file for complete search history.

(56) References Cited

U.S. PATENT DOCUMENTS

| | | | | |
|---|---|---|---|---|
| 6,575,581 | B2* | 6/2003 | Tsurushima | G03B 21/14 353/121 |
| 7,364,309 | B2* | 4/2008 | Sugawara | H04N 5/74 348/E5.119 |
| 7,420,649 | B2* | 9/2008 | Duffield | G03B 21/14 348/E5.137 |
| 7,595,860 | B2* | 9/2009 | Read | E04H 3/22 352/40 |
| 7,980,707 | B2* | 7/2011 | Murphy | G06K 9/00255 353/97 |
| 8,421,991 | B2* | 4/2013 | Read | E04H 3/22 352/40 |
| 9,366,861 | B1 | 6/2016 | Johnson | |
| 2005/0024595 | A1 | 2/2005 | Suzuki | |
| 2006/0170871 | A1 | 8/2006 | Dietz | |
| 2007/0030454 | A1 | 2/2007 | Richards | |
| 2009/0147224 | A1 | 6/2009 | Kurozuka | |
| 2011/0285963 | A1 | 11/2011 | Kurtz | |
| 2015/0219500 | A1 | 8/2015 | Maes | |
| 2016/0274539 | A1 | 9/2016 | Smithwick | |

OTHER PUBLICATIONS

Schulmeister, K. et al. "Risk of Retinal Injury from "Risk Group 2" Laser Illuminated Projectors" Journal of Laser Applications, vol. 28, No. 4, Nov. 2016.

Sliney, D.H. et al. "Optical Safety of Comparative Theater Projectors" Health Physics, 106, 2014.

* cited by examiner

PROJECTOR CONTROLLER AND ASSOCIATED METHOD

CROSS-REFERENCE TO RELATED APPLICATION(S)

This application claims priority of U.S. Provisional Application No. 62/672,288, filed May 16, 2018, which is hereby incorporated by reference in its entirety.

TECHNICAL FIELD

This present application relates to cinema projectors and eye safety.

BACKGROUND

Laser-based digital projectors are gradually replacing lamp-based digital projectors for cinema applications. Depending on design and implementation, laser-based digital projectors may have advantages over lamp-based projectors such as enhanced picture quality, longer life, improved reliability, and lower power draw.

Lasers may emit light at intensity levels sufficient to cause damage to viewers. For example, permanent eye damage may result from looking into a laser beam. To prevent such injuries, lasers are classified according to the damage that they potentially can cause, and the use of lasers in commercial products, such as laser-based digital projectors, is regulated accordingly.

SUMMARY OF THE EMBODIMENTS

In a first aspect, a projector controller includes an object detector and control electronics, and is configured to protect audience members from intense light imposing an exclusion zone in front of a projector. The object detector is configured to optically sense a presence of an object in a detection region beneath the exclusion zone and above the audience members. The control electronics is configured to control the projector when the object detector indicates the presence of the object in the detection region.

In a second aspect, a method for protecting audience members from intense light imposing an exclusion zone in front of an output of a projector is disclosed. The method includes optically sensing a presence of an object in a detection region between the exclusion zone and the audience members. The method also includes controlling the projector when the presence of the object is sensed in the detection region.

BRIEF DESCRIPTION OF THE FIGURES

FIG. 3A is a side view of the projector controller and projector of FIG. 2, of which FIGS. 3B, and 3C are example top views in respective embodiments.

DETAILED DESCRIPTION OF THE EMBODIMENTS

Figure 1:
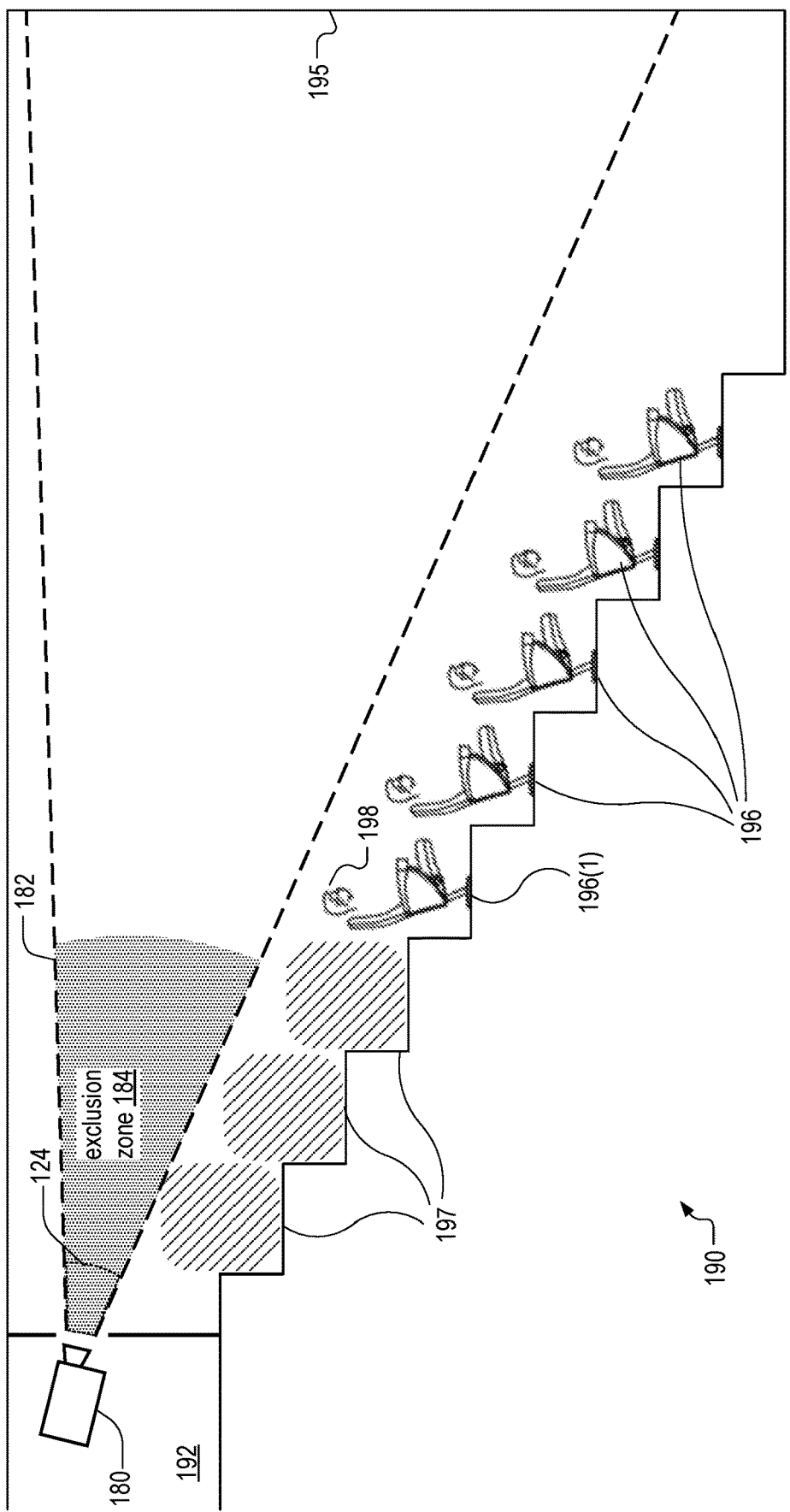
FIG. 1 is a side view of a theater showing removed seats beneath a hazard zone at an output of a projector.

FIG. 1 is a side view of a projector 180 in a projection booth 192 of a theater 190. Projector 180 emits screen illumination 182 onto a screen 195. Screen illumination 182 includes an exclusion zone 184 in which its intensity exceeds an eye-safety threshold. Projector 180 may produce screen illumination 182 of greater intensity than illumination produced by conventional projectors, which have a corresponding conventional exclusion zone 124 that is smaller than exclusion zone 184. Exclusion zone 184 therefore extends over an area of theater 190 that would accommodate theater patrons if theater 190 was equipped with a projector of lower brightness than projector 180. To prevent theater patrons from eye damage if accidentally looking at projector 180 from within exclusion zone 184, a no-seating area 197 may be enforced below exclusion zone 184, such that seating of patrons is limited to rows 196 not below exclusion zone 184. In the example shown in FIG. 1, audience member 198 seated in row 196(1) is further than no-seating area 197 from projector.

Figure 2:
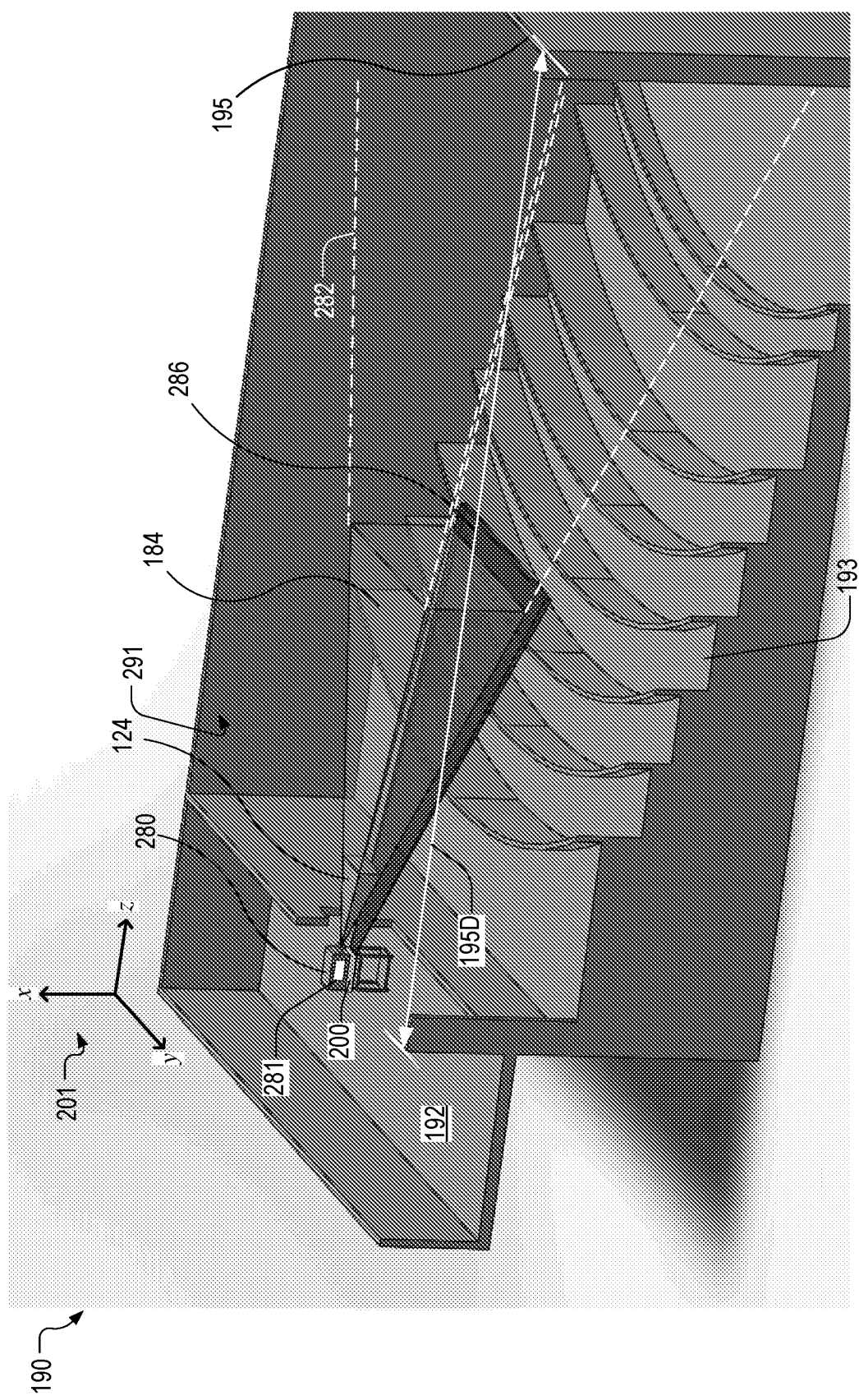
FIG. 2 is a perspective view of a theater, in which a high-intensity projector has a projector controller communicatively coupled thereto, in an embodiment.

FIG. 2 is a perspective view of theater 190, in which a projector controller 200 is communicatively coupled to a projector 280, which is an example of projector 180. A coordinate system 201 denotes directions x, y, and z. Screen 195 may be parallel to the x-y plane, and the z direction may correspond to an optical axis of a lens of projector 280. Screen 195 is located at a screen distance 195D from projector 280, as measured in a plane parallel to the x-z plane. Herein and unless stated otherwise, references to directions or planes denoted by at least one of x, y, or z refer to coordinate system 201. Projector 280 may be located in a projection booth 192.

Projector 280 includes a light source 281. Projector 280 projects at least a portion of the light generated by light source 281 toward screen 195 as screen illumination 282, which is an example of screen illumination 182. Light source 281 may include at least one laser, which results in exclusion zone 184 that is larger than conventional exclusion zone 124. For example, exclusion zone 184 extends over several rows 193 while conventional exclusion zone 124 does not.

One way to remedy the increased risk associated with exclusion zone 184 is to have a no-seating area 197 beneath exclusion zone 184. However, the introduction of no-seating area 197 reduces the seating capacity of theater 190, and hence its revenue potential. Projector controller 200 provides an alternative means for maintaining seating capacity while protecting patrons from high-intensity projector illumination.

Projector controller 200 monitors a detection region 286 for the presence of objects. Detection region 286 extends at least below exclusion zone 184, such that an object (e.g., the head of a theater patron) moving from a row 193 toward exclusion zone 184 is detected by projector controller 200 prior to reaching exclusion zone 184. Projector controller 200 is configured to control projector 280 when detecting the presence of an object in detection region 286. Projector controller 200 may turn off or reduce screen illumination 282 in response to detecting the presence of an object in detection region 286.

Figure 3:
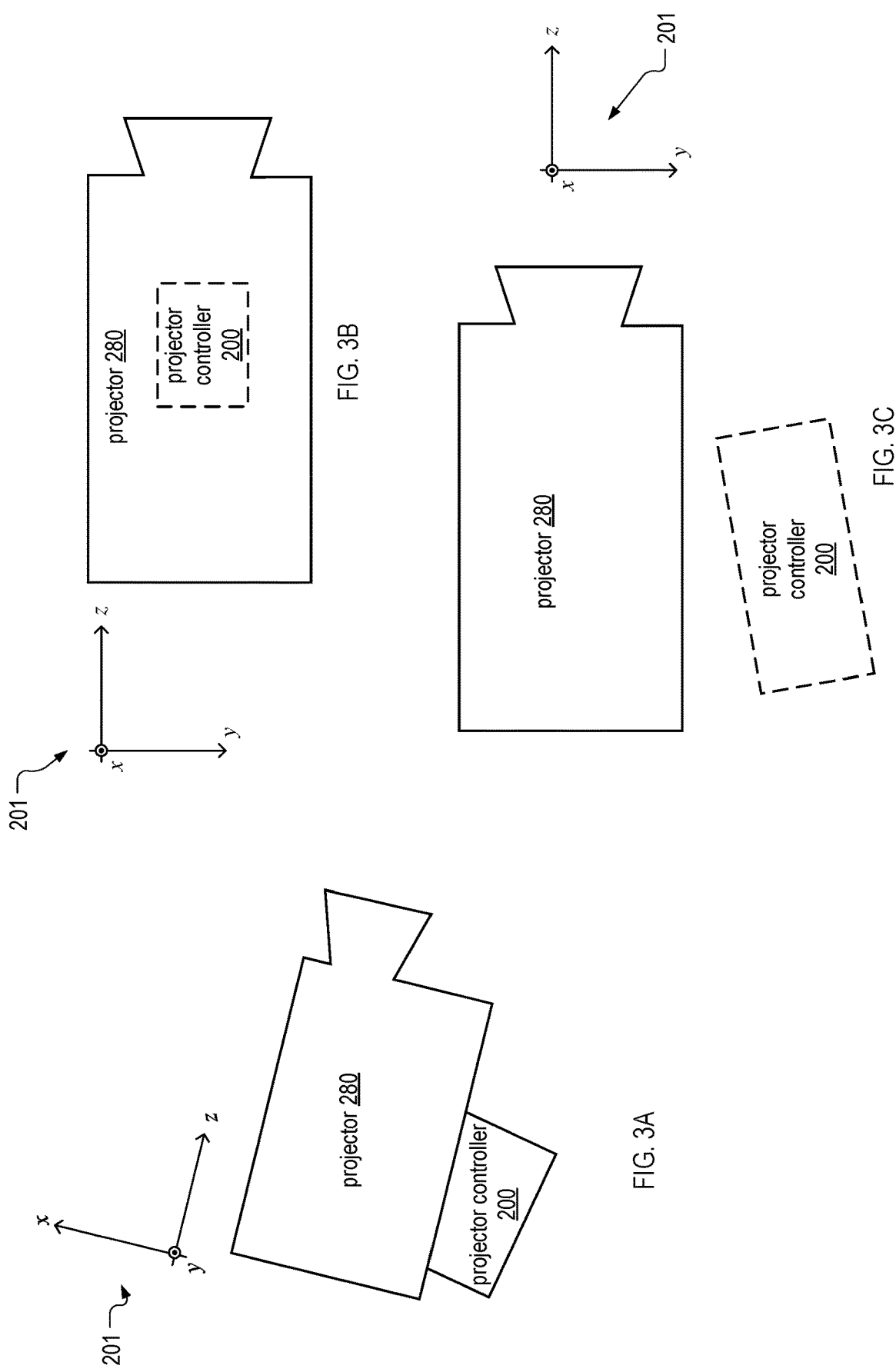

Projector controller 200 may be positioned at different locations with respect to projector 280. FIG. 3A is a schematic side view of projector controller 200 beneath projector 280, which may correspond to the relative positioning of projection controller 200 and projector 280 in either one of the plan views of FIGS. 3B and 3C. FIG. 3B is a plan view of projector controller 200 positioned directly beneath projector 280. FIG. 3C is a plan view of projector controller 200 positioned beneath projector 280, but offset laterally therefrom.

Theater 190 includes a sidewall 291. At least part of projector controller 200 may be located such that it is not beneath projector 280. For example, an optical receiver of projector controller 200 may be closer to sidewall 291 than to projector 280.

Figure 4:
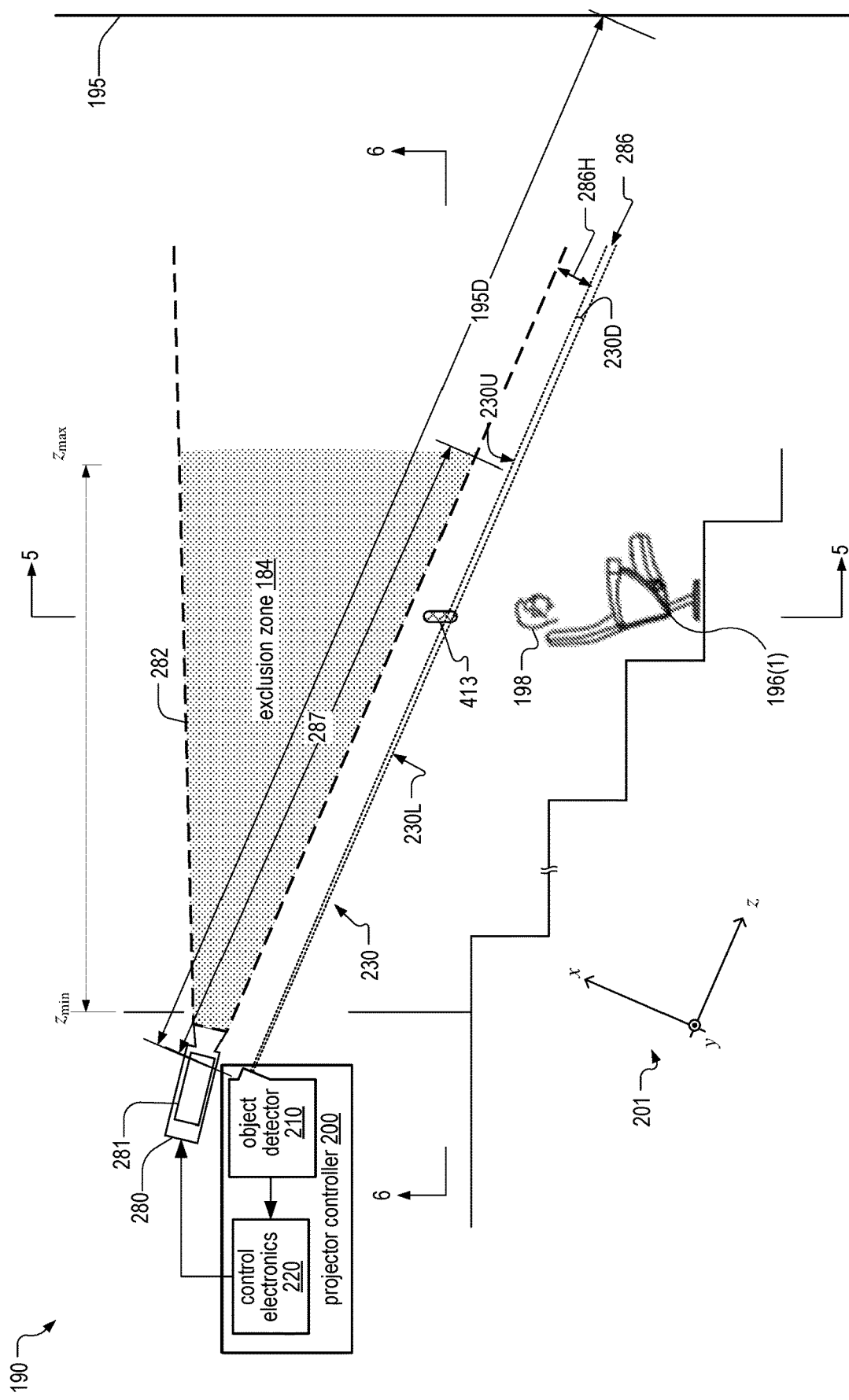
FIG. 4 is a side view of the projector controller of FIG. 2 and an exclusion zone within illumination emitted by the high-intensity projector of FIG. 2.
Figure 5:
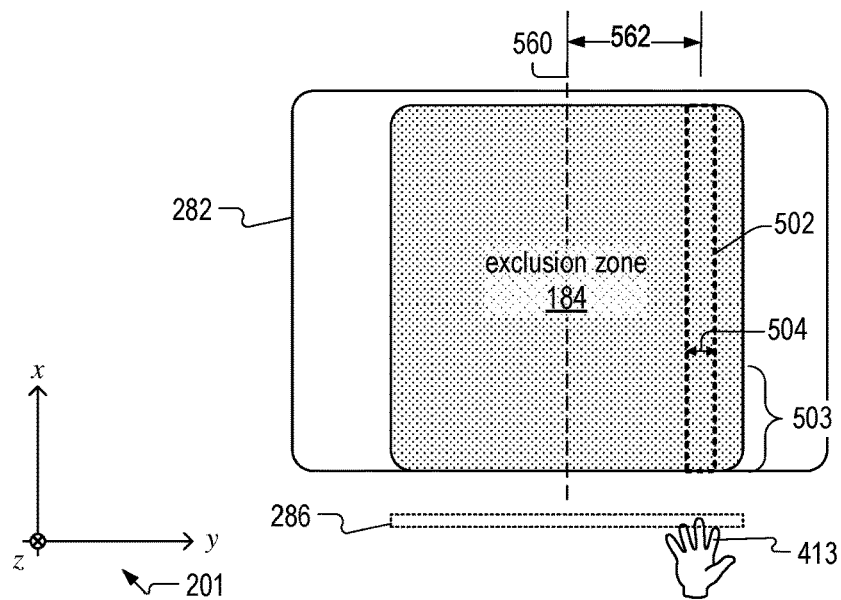
FIGS. 5 and 6 are each cross-sectional views of the exclusion zone of FIG. 4.
Figure 6:
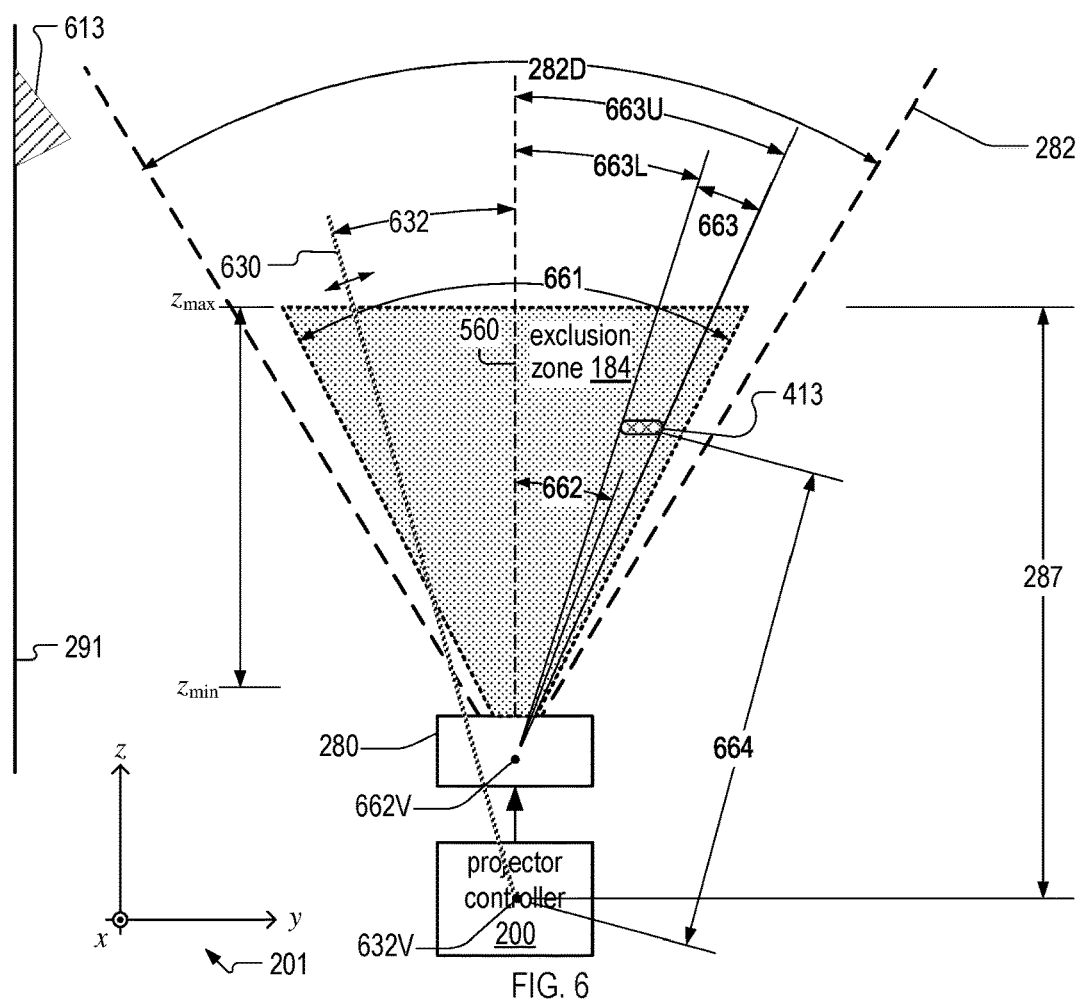

FIG. 4 is a side view of theater 190 in a plane that is parallel to the y-z plane of coordinate system 201. FIG. 4 indicates cross-sectional planes 5 and 6 that are orthogonal to the plane of FIG. 4. FIG. 5 is a view of screen illumination 282 in cross-sectional plane 5, which is parallel to the x-y plane. FIG. 6 is a view of theater 190 in cross-sectional plane 6, which is parallel to the x-z plane. While projector 280 and projector controller 200 need not be in cross-sectional plane 6, they are included in FIG. 6 for illustrative purposes. FIGS. 2 and 4-6 are best viewed together in the following description.

FIGS. 5 and 6 illustrate exclusion zone 184 in planes parallel to the x-y plane and the z-x planes, respectively. FIG. 5 illustrates exclusion zone 184 as having a smaller height (y direction) and smaller width (x direction) than screen illumination 282. Exclusion zone 184 may have the same height and/or the same width as screen illumination 282.

Projector controller 200 is communicatively coupled to projector 280 and includes an object detector 210 and control electronics 220. Without departing from the scope of the present embodiments, at least part of projector controller 200, such as object detector 210 and/or control electronics 220, may be integrated into, or include, projector 280, the combination thereof being a projector system. Object detector 210 and control electronics 220 may be collocated, in a common housing for example, or may be spatially separated while being communicatively connected by a wired and/or wireless communication channel.

Object detector 210 is configured to optically sense presence of an object in detection region 286, which may be at least partially beneath exclusion zone 184 and above audience member 198, as illustrated in FIGS. 2 and 4. Audience member 198 is, for example, in row 193 illustrated in FIG. 2. Exclusion zone 184 may be above additional audience members, e.g., those sitting next to audience member 198 in row 193.

In a plane parallel to the x-z plane, detection region 286 may occupy a region directly beneath at least part of exclusion zone 184. For example, detection region 286 may occupy a region directly beneath exclusion zone 184 at values of z between $z_{min}$ and $z_{max}$, denoted in FIG. 6. The location of $z_{min}$ may correspond to a minimum human-accessible distance from projector 280. The location of $z_{max}$ may correspond to the distal end of exclusion zone 184 in the positive z direction.

Detection region 286 may be defined by a light beam 230 emitted by object detector 210. FIG. 4 illustrates an object 413, which is, for example, a hand or the head of audience member 198. When object 413 is in detection region 286, object 413 may reflect part of light beam 230, which may be detected by projection controller 200.

Light beam 230 may have a divergence angle 230D, or corresponding scan range, between a lower bound 230L and an upper bound 230U, which define a depression-angle interval in the y-z plane, FIG. 4. Light beam 230 may span an azimuthal-angle interval 661, illustrated in FIG. 6, by virtue of having a wide divergence angle in the x-z plane and/or by temporally scanning in the x-z plane. Divergence angle 230D (in the y-z plane) and azimuthal-angle interval 661 (in the x-z plane) define detection region 286. In the x-z plane, screen illumination 282 may traverse or span an azimuthal-angle interval 282D. Azimuthal-angle interval 661 may be less than or equal to azimuthal-angle interval 282D.

In a direction parallel to light beam 230 and with reference to a location within object detector 210 where light beam 230 is generated, a distal end of exclusion zone 184 is located at an exclusion range 287 from object detector 210. Exclusion range 287 is, for example, between one meter and two meters, or up to ten meters. At a distal end of exclusion zone 184 located at exclusion range 287 from projector 280, the intensity of screen illumination 282 may be between thirty and forty milliwatts per square centimeter.

To prevent projector controller 200 from detecting scattered parts of screen illumination 282, light beam 230 may include an electromagnetic wavelength not included in screen illumination 282. For example, light beam 230 may include only electromagnetic wavelengths not included in screen illumination 282. For example, light beam 230 may have spectral content that includes infrared light, and does not include visible light, which provides an additional benefit of being invisible to audience members 198. The infrared light may have a wavelength between 0.8 micrometers and 1.2 micrometers. For example, object detector 210 may include a laser diode that emits light having a spectral peak at $\lambda=905$ nm.

A plane 560 intersects projector 280 and is parallel to the y-z plane, as shown in FIGS. 5 and 6. Plane 560 may include, or be parallel to, a plane that includes the optical axis of a projection lens of projector 280. Plane 560 may also be parallel to the y-z plane, which may be perpendicular to screen 195. In the x-z plane, exclusion zone 184 has an angular extent that spans azimuthal-angle interval 661.

Control electronics 220 is configured to control projector 280 when object detector 210 indicates presence of object 413 at least partially in detection region 286. Object detector 210 may emit a plurality of light beams 230, which may be vertically-arrayed (in the y direction) to enable object detector 210 to determine the extent to which object 413 is in exclusion zone 184.

Object 413 is located at an object angle 662 with respect to plane 560, as shown in FIG. 6. Object 413 is located at an object distance 664 from projector controller 200, which determines an azimuthal angle 663 subtended by object 413. Subtended azimuthal angle 663 is a difference between an upper-bound angle 663U and a lower-bound angle 663L measured with respect to plane 560. Control electronics 220 may be configured to measure at least one of object angle 662, subtended azimuthal angle 663, and object distance 664. Object angle 662 has a corresponding vertex 662V. Vertex 662V is located, for example, at the focal point of projector 280's projection lens.

FIG. 5 illustrates that exclusion zone 184 includes a region 502, which has a horizontal position 562 and width 504 determined, respectively, by object angle 662 and subtended azimuthal angle 663. Object angle 662 determines horizontal position 562. Horizontal position 562 may be defined and/or measured with respect to plane 560. Control electronics 220 may be configured to control projector 280 by reducing intensity of screen illumination 282 projected by projector 280. Such intensity reduction may include at least one of: disabling light source 281, shuttering output of projector 280, disabling production of a highlight of an output image, and limiting a maximum intensity of the output image or of screen illumination 282. A highlight of the output image is, for example, a region of high brightness such as a specular reflection off of a surface in the image, direct sunlight, a luminous object, one region that is substantially more luminous than other regions, or the like.

Limiting the maximum intensity may include globally limiting the intensity of screen illumination 282 or limiting intensity of just one or more regions of screen illumination 282, e.g., of region 502. The output image may be formed by screen illumination 282; the content of the output image is determined, for example, by video data received by projector 280.

Control electronics 220 may reduce screen illumination 282 at selected propagation angles. For example, control electronics 220 may reduce screen illumination 282 in projection directions between angles 663L and 663U such that screen illumination 282 in region 502 is dim compared to other regions of exclusion zone 184. The degree to which that control electronics 220 attenuates screen illumination 282 in region 502 may depend on object distance 664. For example, the degree of attenuation may increase, e.g., monotonically, as object distance 664 decreases to ensure the attenuation is sufficient to lower intensity of screen illumination 282, at object distance 664, to below an eye-damage threshold.

Control electronics 220 may attenuate screen illumination 282 in just part of region 502, such as a lower section 503 corresponding to the vertical position (x direction) of object 413 with respect to detection region 286. Projector controller 200 may have such functionality when it emits a plurality of light beams 230 arrayed in the x direction.

FIG. 6 also illustrates a scanning light beam 630 emitted by certain embodiments of projector controller 200. Light beam 630 is an example of light beam 230 and propagates at propagation angle 632 with respect to plane 560. Projector controller 200 may be configured to scan light beam 630 such that propagation angle 632 traverses azimuthal-angle interval 661 at distance 286H beneath exclusion zone 184. The scan may be periodic with a scanning frequency that exceeds a frame rate of projector 280, for example, when the size of exclusion zone 184 varies in time according to time-dependent brightness of screen illumination 282. Distance 286H is, for example, between zero and fifty centimeters.

In one implementation, projector controller 200 scans light beam 630 to sequentially traverse azimuthal-angle interval 661 at several different distances 286H beneath exclusion zone 184. This implementation may allow for determination of the vertical position (x direction) of object 413, with respect to detection region 286, and thus attenuation of screen illumination 282 in just part of region 502, such as a lower section 503 corresponding to the vertical position of object 413. In another implementation, projector controller 200 scans a plurality of light beams 630 to each traverse azimuthal-angle interval 661 at a different respective distance 286H beneath exclusion zone 184. This implementation may also allow for determination of the vertical position (x direction) of object 413, with respect to detection region 286, and thus attenuation of screen illumination 282 in just part of region 502, such as a lower section 503 corresponding to the vertical position of object 413. In an embodiment, azimuthal-angle interval 661 exceeds azimuthal-angle interval 282D. For example, projector controller 200 may include a test object 613 located outside of azimuthal-angle interval 282D that enables real-time monitoring of whether projector controller 200 is functioning properly. Test object 613 is, for example, a diffuse reflector and may be mounted on sidewall 291 of theater 190, as illustrated in FIG. 6. Test object 613 may be positioned at a fixed location corresponding to a specific value of propagation angle 632, that is, a value outside of azimuthal-angle interval 282D, such that projection controller 200 can distinguish whether light detected by object detector 210 corresponds to light reflected by object 413 or test object 613.

Figure 7:
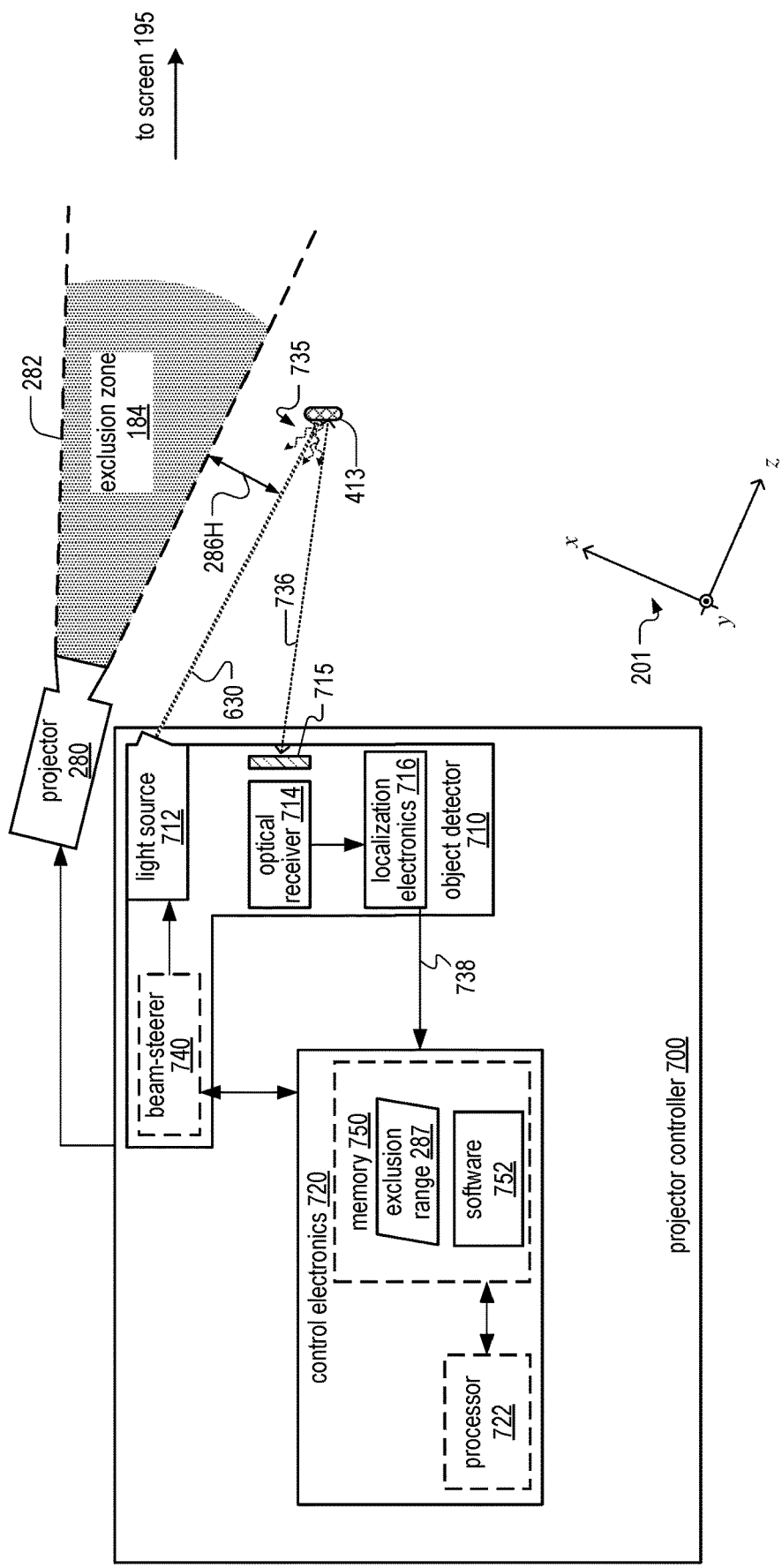
FIG. 7 is a schematic diagram of a projector controller configured to control the projector of FIG. 2, in an embodiment.

FIG. 7 is a schematic diagram of a projector controller 700 configured to control projector 280 operating in theater 190 that includes object 413. Projector controller 700 is an example of projector controller 200, FIG. 2, and includes an object detector 710 and control electronics 720, which are examples of object detector 210 and control electronics 220, respectively.

Object detector 710 includes a light source 712, an optical receiver 714, and localization electronics 716. Light source 712 may be a laser, and may include an infrared light source and is, for example, configured to operate in at least one of a pulsed or a continuous-wave mode of operation. Optical receiver 714 may include at least one of a silicon photodiode, an avalanche photodiode, a photomultiplier tube, and a multi-photon pixel counter. Localization electronics 716 may include at least one of signal-conditioning electronics (a.k.a. a signal conditioner), a transimpedance amplifier, a time-difference circuit, a lock-in amplifier, and an analog-to-digital converter.

Distance 286H may depend on the response time of an optical receiver 714, which, in an embodiment, is 100±50 ms. A minimum value of distance 286H is, for example, determined by the speed at which object 413 traverses light beam 630. The quotient of distance 286H and this speed corresponds to a time interval. This time interval may exceed the response time of receiver 714, such that projector controller 700 has sufficient time to change screen illumination 282 before object 413 reaches it.

Light source 712 is configured to emit light beam 630, part of which is reflected, or scattered, by object 413 as scattered light 735. Scattered light 735 includes scattered light 736 that propagates toward optical receiver 714. Optical receiver 714 is configured to receive at least part of scattered light 735, e.g., scattered light 736. Localization electronics 716 is configured to receive an output of optical receiver 714 and generate a signal 738 indicating presence of scattered light 736 at optical receiver 714. Signal 738 may indicate at least one of the following angles shown in FIG. 6: subtended azimuthal angle 663, upper-bound angle 663U and lower-bound angle 663L.

Object detector 710 may include an optical filter 715 in front of optical receiver 714 to prevent detection of stray light not reflected by object 413. Optical filter 715 may be configured to block light at wavelengths of screen illumination 282. In one example, optical filter 715 transmits infrared light and blocks visible light. Optical filter 715 may be an edge filter or bandpass filter that transmits only one or more wavelength ranges emitted by light source 712 and/or blocks wavelength ranges or screen illumination 282.

Control electronics 720 may include at least one of a processor 722 and a memory 750 communicatively coupled thereto. Memory 750 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 750 may be integrated into processor 722. Memory 750 may store at least one of exclusion range 287 and software 752.

Object detector 710 may include a beam-steerer 740 configured to scan light beam 630, via changing propagation angle 632, across azimuthal-angle interval 661 at a beam-scanning rate. Beam-steerer 740 may include at least one of a rotating polygonal mirror, a scanning galvanometer mirror, and a MEMS mirror array. Control electronics 720 may be communicatively coupled to beam-steerer 740 and configured, e.g., via machine-readable instructions of software 752, to at least one of: (a) control or determine time-dependence of propagation angle 632, (b) determine a value of propagation angle 632 corresponding to when optical receiver 714 receives scattered light 736, and (c) measure object angle 662.

Figure 8:
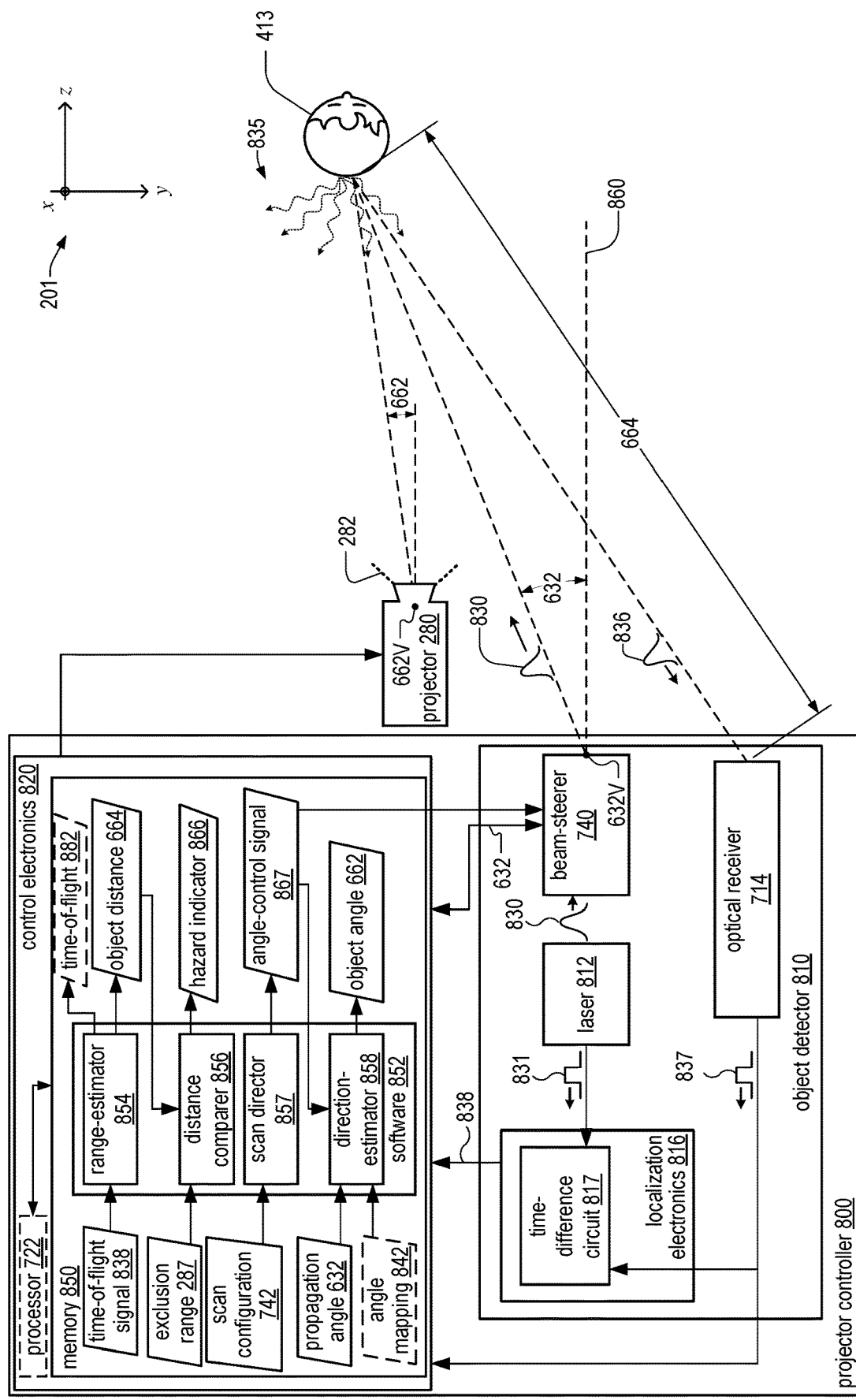
FIG. 8 is a functional block diagram of a projector controller based on time-of-flight measurements, in an embodiment.

FIG. 8 is a functional block diagram of a projector controller 800, which is an example of projector controller 700. Projector controller 800 includes an object detector 810 and control electronics 820. Object detector 810 is an example of object detector 710, and includes, optical receiver 714, localization electronics 816, a laser 812, and beam-steerer 740. Localization electronics 816 is an example of localization electronics 716, and includes a time-difference circuit 817. Time-difference circuit 817 may be or include a time-to-digital converter. Laser 812 is an example of light source 712, and may qualify as a Class 1 laser as defined by the American National Standards Institute. Control electronics 820 is an example of control electronics 720, and stores memory 850, which is an example of memory 750. Memory 850 includes software 852, which is an example of software 752.

Software 852 of memory 850 may store at least one of exclusion range 287, propagation angle 632, a scan configuration 742, a range-estimator 854, a distance comparer 856 (similar to distance comparer 756), a scan director 857 (similar to scan director 757), a direction estimator 858 (similar to distance comparer 758), and an angle mapping 842. Range-estimator 854 may generate at least one of time-of-flight 882 and an object distance 664. Distance comparer 856, scan director 857, and direction estimator 858 may generate and/or determine, respectively, a hazard indicator 866, angle-control signal 867, and object angle 662. Scan director 857 may generate angle-control signal 867 based on scan configuration 742, which may include at least one of a sweep frequency and a sweep magnitude. Scan configuration 742 may be stored in a memory of beam-steerer 740.

In an example scenario, object 413 is within a field of view of optical receiver 714 and is located at object angle 662 with respect to a plane 860. Plane 860 is an example of plane 560, FIGS. 5 and 6. Hence, plane 860 may include the optical axis of projector 280 communicatively coupled to projector controller 800.

In operation, laser 812 is configured to emit an optical pulse 830 and generate a start pulse 831 to be received by time-difference circuit 817. Generation of start pulse 831 may be simultaneous with, or temporally offset by a known value from, emission of optical pulse 830. In the example of FIG. 8, optical pulse 830 has associated propagation angle 632, which beam-steerer 740 varies in time such that propagation angle 632 spans azimuthal-angle interval 661 of exclusion zone 184, FIG. 6. FIG. 8 illustrates when propagation angle 632 results in optical pulse 830 being incident on object 413. Object 413 reflects optical pulse 830 as scattered pulsed 835, which includes scattered pulse 836 at least part of which propagates toward optical receiver 714. Optical pulse 830 is an example of light beam 630. Scattered pulses 835 and 836 are examples of scattered light 735 and 736, respectively.

Propagation angle 632 has a corresponding vertex 632V. Vertex 632V is located, for example, on or proximate to a final optical surface of beam-steerer 740 that steers, e.g., via reflection or refraction, optical pulse 830 before exiting beam-steerer 740.

Upon detecting scattered pulse 836, optical receiver 714 may generate a stop pulse 837 to be received by time-difference circuit 817. Based on start pulse 831 and stop pulse 837, localization electronics 816, e.g., via time-difference circuit 817, generates time-of-flight signal 838 that is received by control electronics 820. Range-estimator 854 processes time-of-flight signal 838 to determine at least one of a time-of-flight 882 of scattered pulse 836 and object distance 664 between object 413 and optical receiver 714. Each of time-of-flight 882 and object distance 664 may be stored in memory 850. Time-of-flight signal 838 is an example of signal 738, FIG. 7.

Control electronics 820 may be configured to control projector 280 by reducing intensity of screen illumination 282 based on the measured time-of-flight 882. For example, control electronics 820 may be configured to reduce at least a spatial region of screen illumination 282, e.g., region 502, when time-of-flight 882 corresponds to object distance 664 that is less than exclusion range 287. Software 852 may include distance comparer 856, which outputs a hazard indicator 866 when object distance 664 is less than exclusion range 287. Accordingly, control electronics 820 may be configured to control projector 280 by reducing intensity of screen illumination 282 based on the value of hazard indicator 866.

Control electronics 820 may also be configured to determine the value of object angle 662 from scattered pulse 836. For example, beam-steerer 740 may be configured to continuously transmit updated values of propagation angle 632 to control electronics 820. Furthermore, control electronics 820 may transmit angle-control signal 867 to beam-steerer 740, which controls propagation angle 632 at any given time.

Control electronics 820 may determine object angle 662 based on a clock time corresponding to stop pulse 837. For example, when the vertex of propagation angle 632 aligns with vertex 662V of object angle 662 in the x-z plane, object angle 662 may equal the value of propagation angle 632 corresponding to a time associated with generation of stop pulse 837.

More generally, when such alignment does not apply, propagation angle 632 may be mapped to object angle 662 via angle mapping 842. Angle mapping 842 is, for example, a look-up table or function that maps a range of possible propagation angles 632 to corresponding measured object angles 862 based on relative positions of vertex 662V and 632V in the x-z plane. For example, propagation angle 632 may be mapped to a corresponding object angle 662 (or object angle 662) using at least one of planar geometry and trigonometry.

Accordingly, control electronics 820 may be configured to control projector 280 by reducing intensity of screen illumination 282 based on the value of object angle 662 determined by direction estimator 858. For example, in response to detection of object 413 in detection region 286 (FIGS. 5 and 6), intensity of screen illumination 282 may be reduced in an angular region centered at object angle 662, which results in at least part of region 502 being temporarily dimmed.

Figure 9:
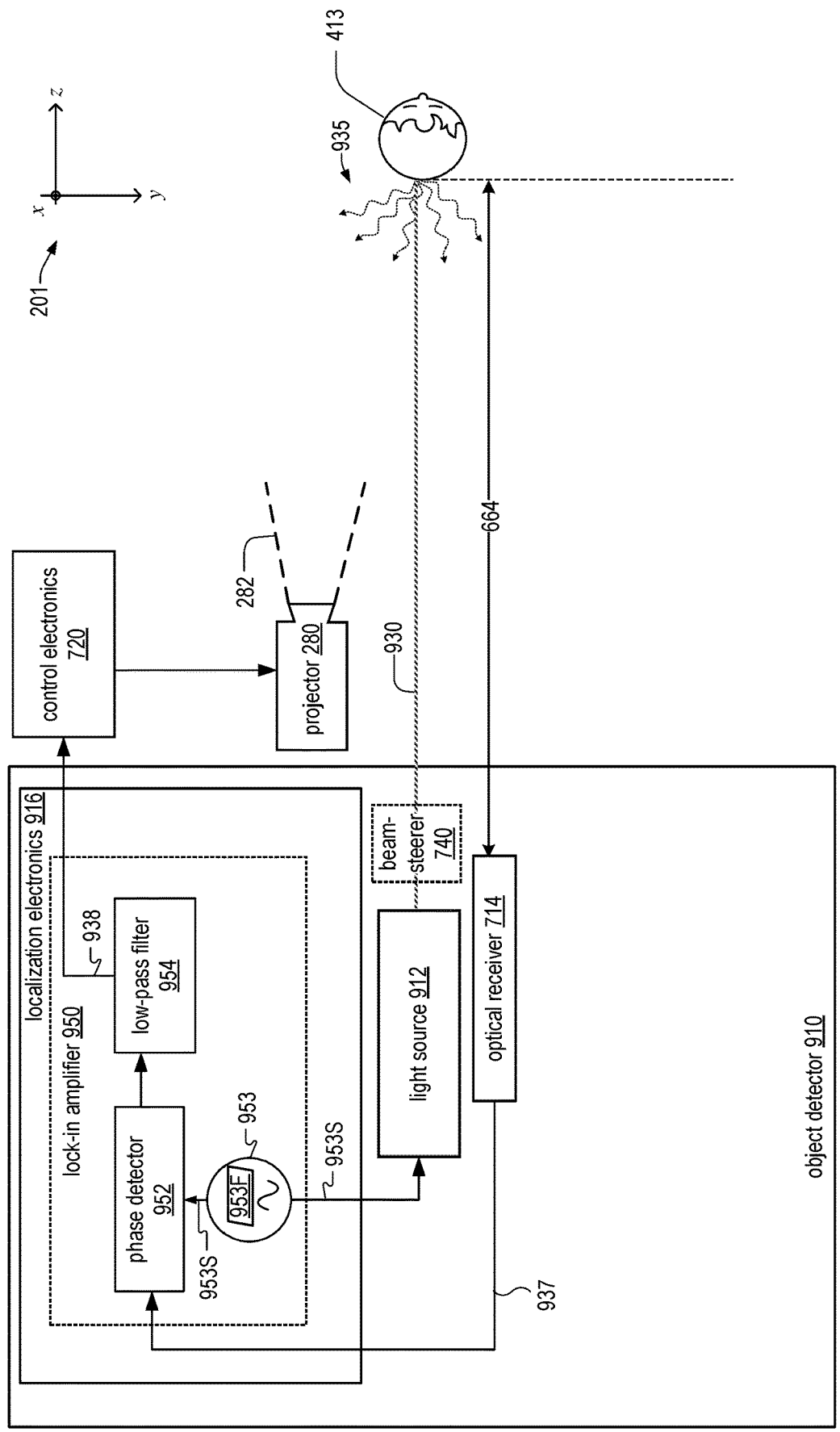
FIG. 9 is a functional block diagram of a projector controlled based on optical phase-shift range finding, in an embodiment.

FIG. 9 is a functional block diagram of an object detector 910, which is an example of object detector 710. Object detector 910 includes a light source 912, optical receiver 714, and localization electronics 916. Light source 912 and localization electronics 916 are examples of light source 712 and localization electronics 716, respectively. Light source 912 is a laser, for example. Localization electronics 916 may include at least one of a phase detector 952, an oscillator 953, and a low-pass filter 954 each of which may be part of a lock-in amplifier 950. Phase detector 952 may include at least one demodulator.

Light source 912 is configured to emit amplitude-modulated sensing-light 930 at a modulation frequency 953F. For example, oscillator 953 drives light source 912 with an oscillator signal 953S such that light source 912 emits amplitude-modulated sensing-light 930.

Object 413 reflects amplitude-modulated sensing-light 930 as amplitude-modulated scattered light 935. Amplitude-modulated scattered light 935 has a group velocity $v_g$. Modulation frequency 953F may correspond to a temporal period T such that product $v_g T$ is a distance that exceeds screen distance 195D, FIG. 2. Such a configuration enables an unambiguous matching between a peak-amplitude of amplitude-modulated sensing-light 930 and its reflected component in amplitude-modulated scattered light 935 detected by optical receiver 714.

Amplitude-modulated scattered light 935 is phase-delayed by a phase $\Delta\phi$ with respect to amplitude-modulated sensing-light 930. Optical receiver 714 generates a signal 937 in response to detection of amplitude-modulated scattered light 935. Localization electronics 916 receives signals 953S and 937 and determines, via phase detector 952 for example, phase $\Delta\phi$ therefrom, and generates a phase signal 938 that includes phase $\Delta\phi$. Phase signal 938 is an example of signal 738, FIG. 7.

Control electronics 720 may receive phase signal 938 and determine at least one of object distance 664 and hazard indicator 866 therefrom. Accordingly, control electronics 720 may be configured to control projector 280 by reducing intensity of screen illumination 282 based on the value of hazard indicator 866. Object detector 910 may include beam-steerer 740, and may be configured with communicate with control electronics 720 to determine object angle 662, as explained regarding FIG. 8.

Figure 10:
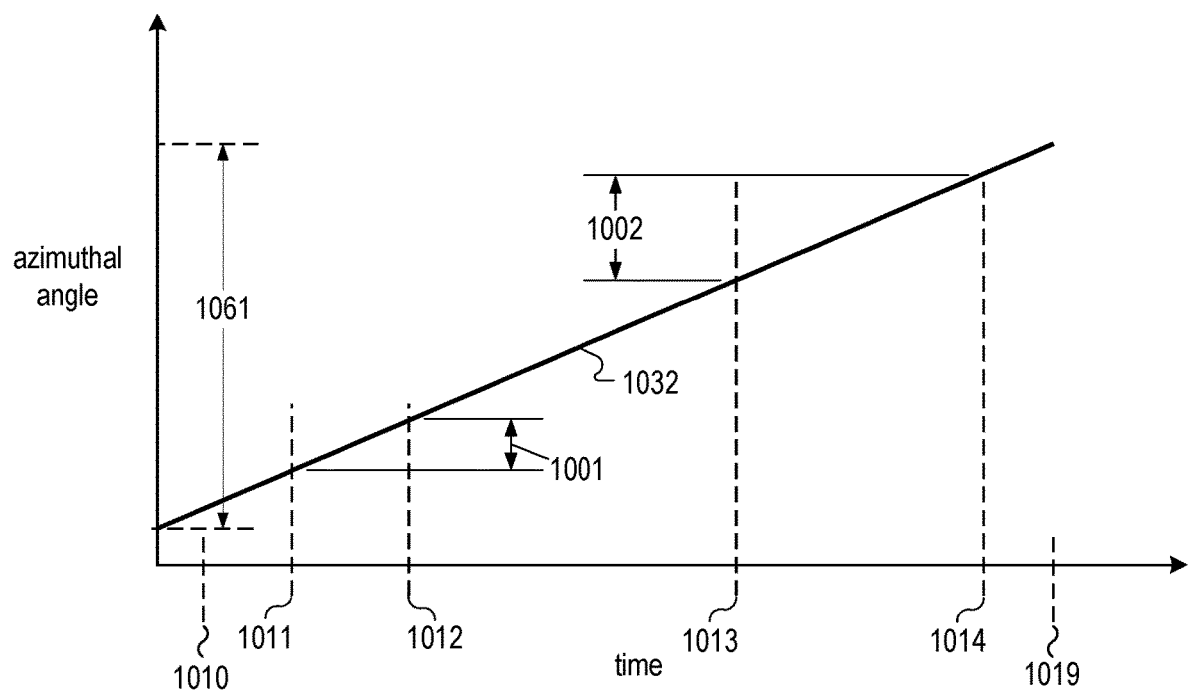
FIG. 10 is an example plot of the azimuthal angle of the laser beam of FIGS. 7-9 versus time when using the beam-steering mechanism of FIG. 8.
Figure 11:
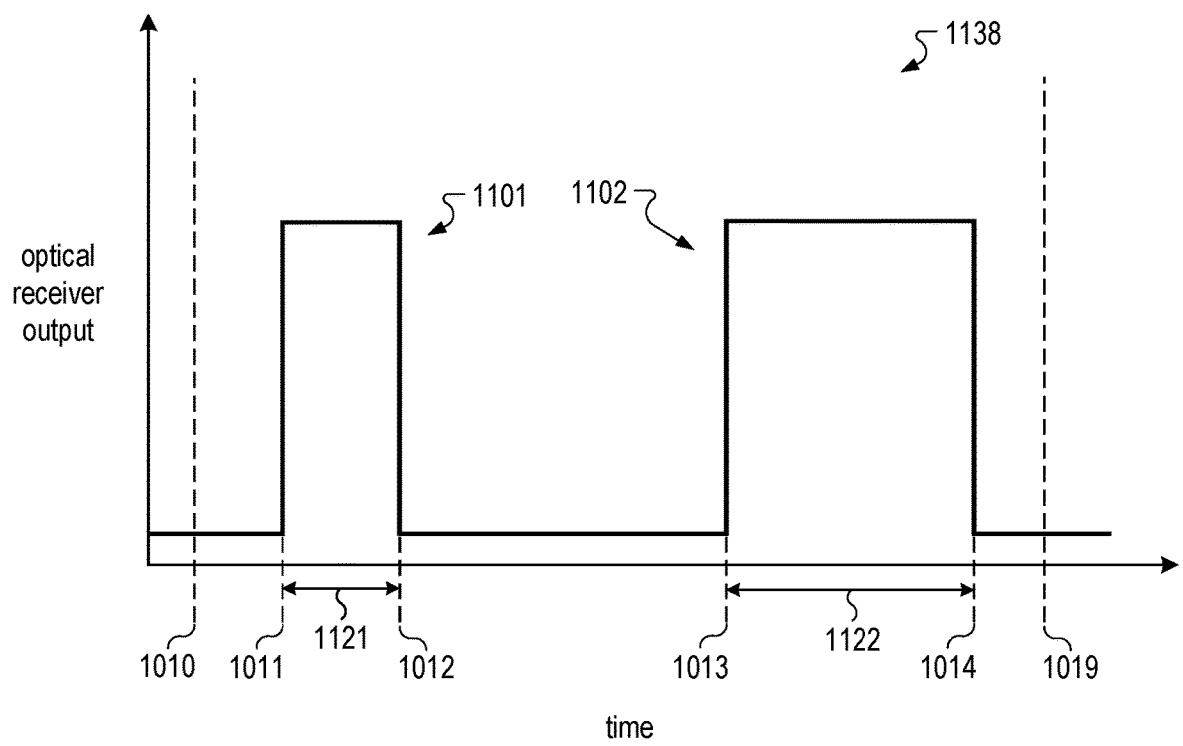
FIG. 11 is an example plot of an output signal of the object detector of FIGS. 7-9 versus time when detecting two objects with the beam-steering mechanism of FIG. 8.

FIG. 10 is a plot showing time-dependence of an azimuthal angle 1032 between a start time 1010 and an end time 1019. FIG. 11 is a plot showing time-dependence of an optical receiver signal 1138 between start time 1010 and end time 1019. FIGS. 10 and 11 are best viewed together in the following description. Azimuthal angle 1032 is an example of propagation angle 632. Optical receiver signal 1138 is an example of signal 738, FIG. 7.

Each value of azimuthal angle 1032 within an azimuthal-angle interval 1061, FIG. 10, is an example of propagation angle 632 of light beam 630 generated by projector controller 200, FIG. 6. Values of azimuthal angle 1032 span azimuthal-angle interval 1061, which is an example of azimuthal-angle interval 661. Optical receiver signal 1138 includes pulses 1101 and 1102. Pulse 1101 has a temporal duration 1121 between times 1011 and 1012. Pulse 1102 has a temporal duration 1122 between times 1013 and 1014.

Pulses 1101 and 1102 correspond to when at least part of object 413 enters detection region 286, as illustrated in FIG. 4 for example. Since object 413 may be a person's head facing projector 280, preventing eye damage entails that projector controller 200 reduces intensity of screen illumination 282 at object angles 662 corresponding to azimuthal angles 1032 at times corresponding to pulses 1101 and 1102. FIG. 10 denotes these corresponding azimuthal angles as angle-ranges 1001 and 1002, which correspond to pulses 1101 and 1102, respectively.

Propagation angle 632 may equal an angle within angle-ranges 1001 and 1002. Direction estimator 858 may determine object angle 662 to span an interval of propagation angles of light beam 630 that corresponds to, per angle mapping 842, at least one of angle-ranges 1001 and 1002.

Figure 12:
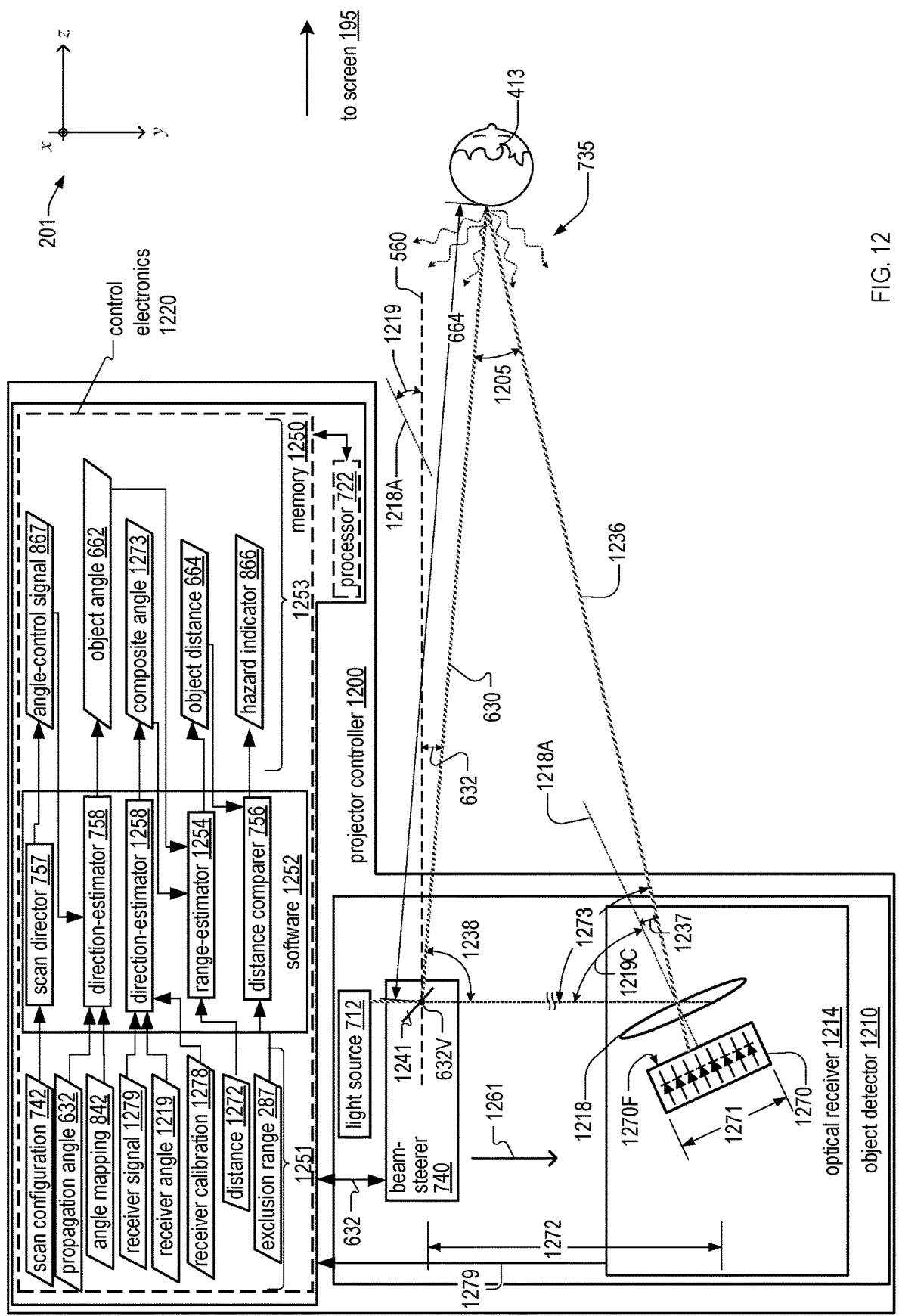
FIG. 12 is a functional block diagram of a projector controller based on position-sensitive detection with a single detector array, in an embodiment.

FIG. 12 is a schematic block diagram of a projector controller 1200, which is an example of projector controller 200, FIG. 2. Projector controller 1200 includes object detector 1210 and control electronics 1220, which are examples of object detector 210 and control electronics 220, respectively. Projector controller 1200 is configured to determine both object angle 662 and object distance 664 based upon position-sensitive detection of scattered light. Projector controller 1200 does not require the time-of-flight or phase detection techniques of object detectors 810 and 910, respectively, or their associated projector controller 700.

Object detector 1210 includes light source 712, beam-steerer 740, and an optical receiver 1214, which is an example of optical receiver 714. Optical receiver 1214 includes a position-sensitive detector 1270 and a lens 1218. Position-sensitive detector 1270 has a width 1271 and may include a plurality of photodetectors arrayed in the x-z plane. Examples of position-sensitive detector 1270 include commercially available multi-element photodiode arrays and multichannel array photodetectors, such as those configured to detect infrared light. Lens 1218 has an optical axis 1218A, which may be perpendicular to a front surface 1270F of position-sensitive detector 1270. In the x-z plane, optical axis 1218A intersects plane 560 at a receiver angle 1219. Optical receiver 1214 generates a receiver signal 1279 indicative of the electrical response of position-sensitive detector 1270 to scattered light incident thereon.

Beam-steerer 740 and optical receiver 1214 are separated by a distance 1272 in a direction 1261 in the x dimension. For simplicity of explanation, direction 1261 is perpendicular to plane 560 in the following discussion. However, direction 1261 may be at an oblique angle to plane 560 without departing from the scope hereof. Lens 1218 is oriented such that its optical axis 1218A is oriented a receiver angle 1219C with respect to direction 1261. Angles 1219 and 1219C are complementary.

Distance 1272 may be many times larger than width 1271 of position-sensitive detector 1270. For example, width 1271 may be less than ten centimeters and distance 1272 may exceed two meters. Distance 1272 may be sufficiently large that optical receiver 1214 may be mounted on a sidewall 291 of theater 190, FIG. 2, while beam-steerer 740 is beneath and/or directly beneath projector 280.

Beam-steerer 740 is configured to steer light beam 630 emitted by light source 712 such that light beam 630 propagates at propagation angle 632 with respect to plane 560. In the example of FIG. 12, light beam 630 reflects off of a surface 1241 of beam-steerer 740. Surface 1241 is, for example, a planar reflective surface of a rotating polygonal mirror, a scanning galvanometer mirror, or a MEMS mirror array. Light beam 630 propagates at propagation angle 632 with respect to plane 560 and at an angle 1238 with respect to direction 1261. Angles 1238 and 632 are complementary in this example.

Light beam 630 scatters off of object 413 as scattered light 735. Scattered light 735 propagating toward optical receiver 1214 is characterized by a chief ray 1236 relative to optical receiver 1214. Chief ray 1236 is an example of scattered light 736. Propagation directions of chief ray 1236 and light beam 630 differ by an angle 1205. Upon reaching optical receiver 1214, chief ray 1236 is incident on lens 1218 at an incident angle 1237 with respect to optical axis 1218A. Angles 1237 and 1219C sum to a composite angle 1273. Angle 1238 and propagation angle 632 are complementary. Angles 1238, 1273, and 1205 sum to $\pi$ radians.

Lens 1218 transmits chief ray 1236, and refracts scattered light 735, incident thereon onto position-sensitive detector 1270 at a position thereon determined by incident angle 1237. Hence, receiver signal 1279 may be processed, e.g., by control electronics 720, to determine incident angle 1237. Position-sensitive detector 1270 enables determination of object distance 664 from at least one of distance 1272, angle 1205, angle 1237, and angle 1238, for example, via trigonometric relations such as the law of sines.

Control electronics 1220 may include at least one of processor 722 and a memory 1250 communicatively coupled thereto. Hardware attributes of memory 1250 are similar to those of memory 750. Memory 1250 may store inputs 1251, software 1252, and outputs 1253.

Inputs 1251 include at least one of scan configuration 742, propagation angle 632, angle mapping 842, a receiver calibration 1278, receiver signal 1279, distance 1272, receiver angle 1219, and exclusion range 287. Memory 1250 may receive propagation angle 632 from beam-steerer 740 or from angle-control signal 867. Memory 1250 may receive receiver signal 1279 from optical receiver 1214. Receiver calibration 1278 may include a mapping of location of light detected by position-sensitive detector 1270 to incident angle 1237.

Software 1252 includes scan director 857, direction estimator 858, and distance comparer 856, each of which are described above with reference to software 852, FIG. 8. Software 1252 also includes a direction estimator 1258, and a range-estimator 1254.

Processor 722 executes software 1252 to generate outputs 1253 from inputs 1251. Scan director 857 generates angle-control signal 867 from scan configuration 742. Control electronics 1220 may control beam-steerer 740 via angle-control signal 867. Direction estimator 858 generates object angle 662 from at least one of propagation angle 632, angle mapping 842, and angle-control signal 867. Direction estimator 1258 generates composite angle 1273 from receiver signal 1279 and receiver angle 1219.

Range-estimator 1254 determines object distance 664 from distance 1272, object angle 662, and composite angle 1273. For example, range-estimator 1254 may employ the law of sines to determine object distance 664 from angle 1238, composite angle 1273, and distance 1272, where angles 1238 and 862 are complementary. Distance comparer 856 may generate hazard indicator 866 when object distance 664 is less than exclusion range 287.

In various embodiments, an object detector (e.g., object detector 1210) may be designed to detect objects in a hazard zone based on the invisible infrared signals. The invisible infrared light may be emitted by, e.g., one or more infrared lasers. In addition to or instead of the infrared light detection, a visible light source, with a power at a safe level, may illuminate body parts or objects that enter a hazard zone as a warning. When a person violates a safety rule and enters a hazard zone or places an object into the hazard zone, the visible light prompts the person to move outside of the hazard zone or remove the object from the hazard zone.

For example, in a theater, a red laser can be used to generate a plane of red light (or any other colors) above a head level of the audience as a warning device. In some embodiments, the red light may be disposed at the same plane (or slightly above or below) of the infrared light. The red light may be turned on as warning when a body part or an object extends across the plane of the infrared light.

Figure 13:
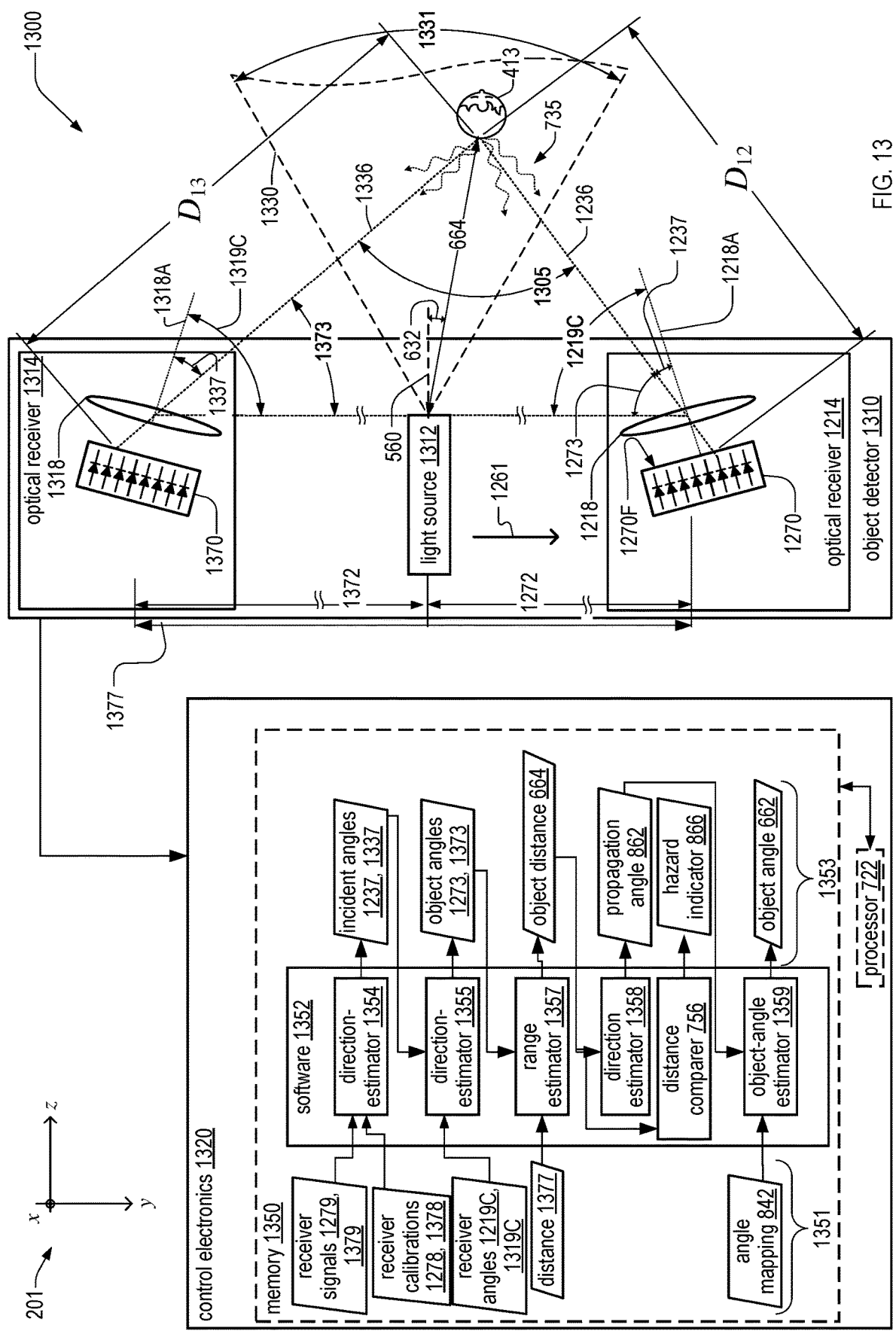
FIG. 13 is a functional block diagram of a projector controller based on position-sensitive detection with two detector arrays, in an embodiment.

FIG. 13 is a functional block diagram of a projector controller 1300 based on position-sensitive detection with a two detector arrays. Projector controller 1300 is an example of projector controller 200, and includes object detector 1310 and control electronics 1320.

Object detector 1310 includes a light source 1312, optical receiver 1214, and a second optical receiver 1314. Second optical receiver 1314 is similar to optical receiver 1214, and includes a position-sensitive detector 1370 and a lens 1318, which are analogs to position-sensitive detector 1270 and a lens 1218, respectively. Second optical receiver 1314 may be identical to optical receiver 1214. Lens 1318 has an optical axis 1318A, which is analogous to optical axis 1218A.

Control electronics 1320 may include at least one of processor 722 and a memory 1350 communicatively coupled thereto. Hardware attributes of memory 1350 are similar to those of memory 750. Memory 1350 may store inputs 1351, software 1352, and outputs 1353.

Light source 1312 is configured to emit divergent beam 1330, which propagates in the x-z plane and is an example of light beam 230. Divergent beam 1330 has a beam-divergence angle 1331 that may span azimuthal-angle interval 661, FIG. 6. Light source 1312 second optical receiver 1314 are separated in the x direction by a distance 1372 in direction 1261. Distances 1272 and 1372 sum to a distance 1377, which may be included in inputs 1351. FIG. 13 depicts projector controller 1300 behind object 413, which intersects a portion of divergent beam 1330 propagating at propagation angle 632 with respect to plane 560.

As in FIG. 12, optical receiver 1214 is oriented at receiver angle 1219 (not shown in FIG. 13) with respect to plane 560, where receiver angle 1219 is complementary to angle 1219C. Second optical receiver 1314 is oriented at a receiver angle with respect to plane 560, the receiver angle being complementary to an angle 1319C between optical axis 1318A and direction 1261. Inputs 1351 may include at least one of angles 1219C and 1319C, or equivalently their respective complementary angles. Inputs 1351 may also include a receiver calibration 1378, which is similar to receiver calibration 1278.

In an exemplary use scenario, part of divergent beam 1330 scatters off of object 413 as scattered light 735. Scattered light 735 propagating toward optical receivers 1214 and 1314 are characterized by respective chief rays 1236 and 1336 relative to optical receivers 1214 and 1314 respectively. Chief ray 1336 is an example of scattered light 736, and forms an object angle 1373 with respect to direction 1261. Optical receivers 1214 and 1314 generate respective receiver signals 1279 and 1379 indicative of the electrical response of position-sensitive detectors 1270 and 1370 to respective chief rays 1236 and 1336 incident thereon. Inputs 1351 may include at least one of receiver signals 1279 and 1379.

Propagation directions of chief rays 1236 and 1336 differ by an angle 1305. Upon reaching optical receiver 1214, chief ray 1236 is incident on lens 1218 at incident angle 1237 with respect to optical axis 1218A. Upon reaching second optical receiver 1314, chief ray 1336 is incident on lens 1218 at an incident angle 1337 with respect to optical axis 1318A. Angles 1373 and 1337 sum to angle 1319C. Angles 1273, 1373, and 1305 sum to π radians.

Lens 1318 transmits chief ray 1336, and refracts scattered light 735 incident thereon onto position-sensitive detector 1370 at a position thereon determined by incident angle 1337. Receiver signal 1379 may be processed, e.g., by control electronics 1320, to determine incident angle 1337. Position-sensitive detector 1270 enables determination of object distance 664 from at least one of distance 1272, angle 1205, angle 1237, and angle 1238, for example, via trigonometric relations such as the law of sines.

Processor 722 executes software 1352 to generate outputs 1353 from inputs 1351. Software 1352 may include a direction estimator 1354, which determines (a) incident angle 1237 from receiver signal 1279 and receiver calibration 1278 and (b) incident angle 1337 from receiver signal 1379 and receiver calibration 1378. Software 1352 may include a direction estimator 1355, which determines (a) composite angle 1273 from incident angle 1237 and receiver angle 1219C and (b) object angle 1373 from incident angle 1337 and receiver angle 1319C. For example, object angle 1373 equals incident angle 1337 subtracted from receiver angle 1319C.

Software 1352 may include a range estimator 1357, a direction estimator 1358, and an object-angle estimator 1359. Range estimator 1357 determines object distance 664. For example, range estimator 1357 employs the law of sines to determine at least one of a distance $D_{12}$ between object 413 and position-sensitive detector 1270 and a distance $D_{13}$ between object 413 and position-sensitive detector 1370, from which the law of cosines may be employed to determine object distance 664. Direction estimator 1358 may determine propagation angle 632 by using the law of sines, distance $D_{12}$, object distance 664, and angle 1273 to determine angle 1238 and its complement, propagation angle 632. Object-angle estimator 1359 may determine object angle 662 from propagation angle 862 and angle mapping 842.

Figure 14:
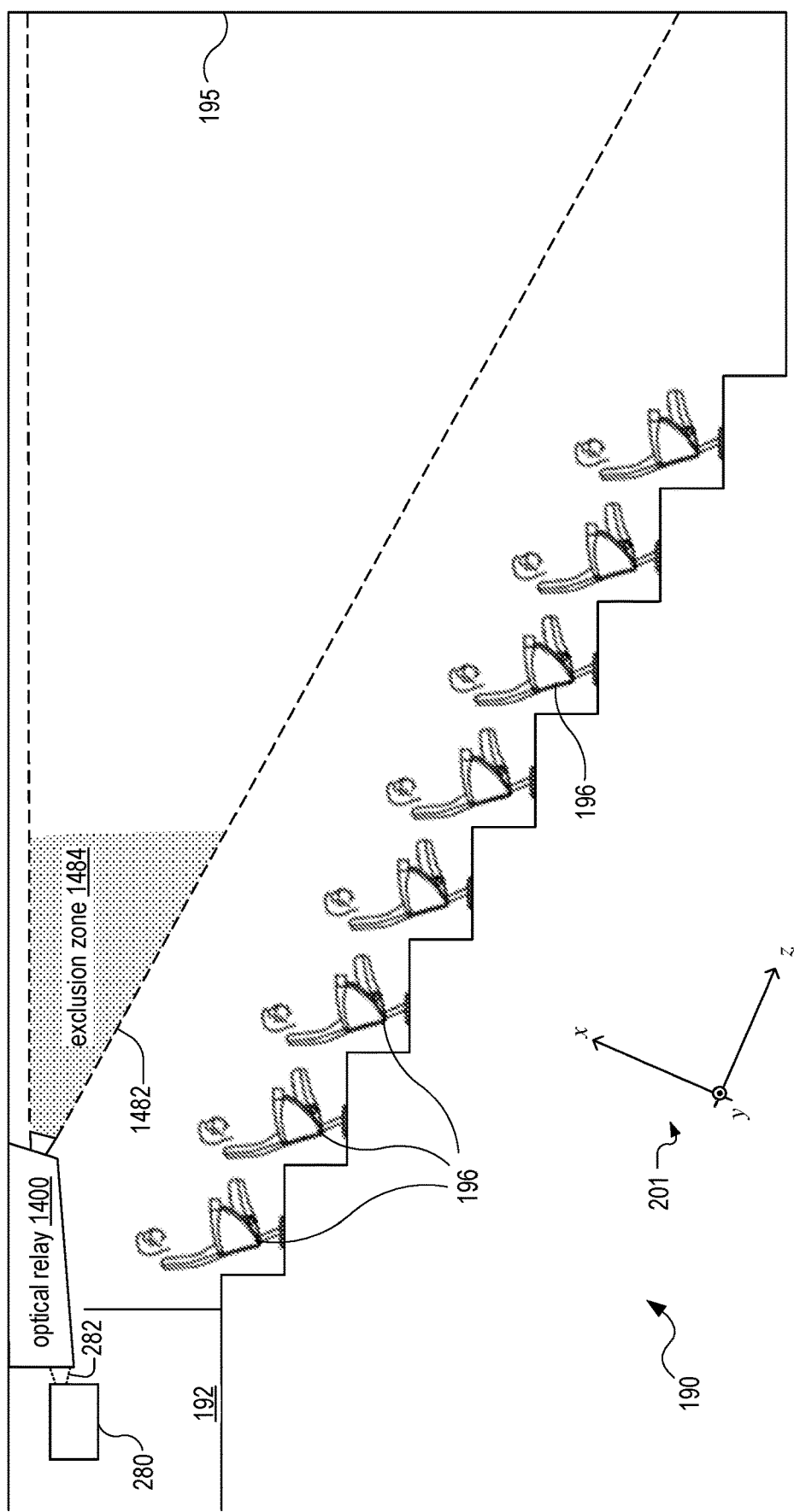
FIG. 14 is a side view of a first optical relay configured to redirect projector illumination from the projector of FIG. 2, in an embodiment.

FIG. 14 is a side view of projector 280 operating in theater 190, in which an optical relay 1400 is configured to redirect screen illumination 282, as redirected illumination 1482, away from seats 196 and toward screen 195, so as to increase the distance between seats 196 and an exclusion zone 1484, which is an example of exclusion zone 184. At least part of optical relay 1400 may be located in projection booth 192. Part of optical relay 1400 may extend outside of projection booth 192. Optical relay 1400 may include at least one of a mirror, a relay lens, a relay imaging system, a relay lens assembly, and an optical fiber. Optical relay 1400 has an associated relay length corresponding to a distance light propagates therein. The relay length may be between one meter and ten meters.

Figure 15:
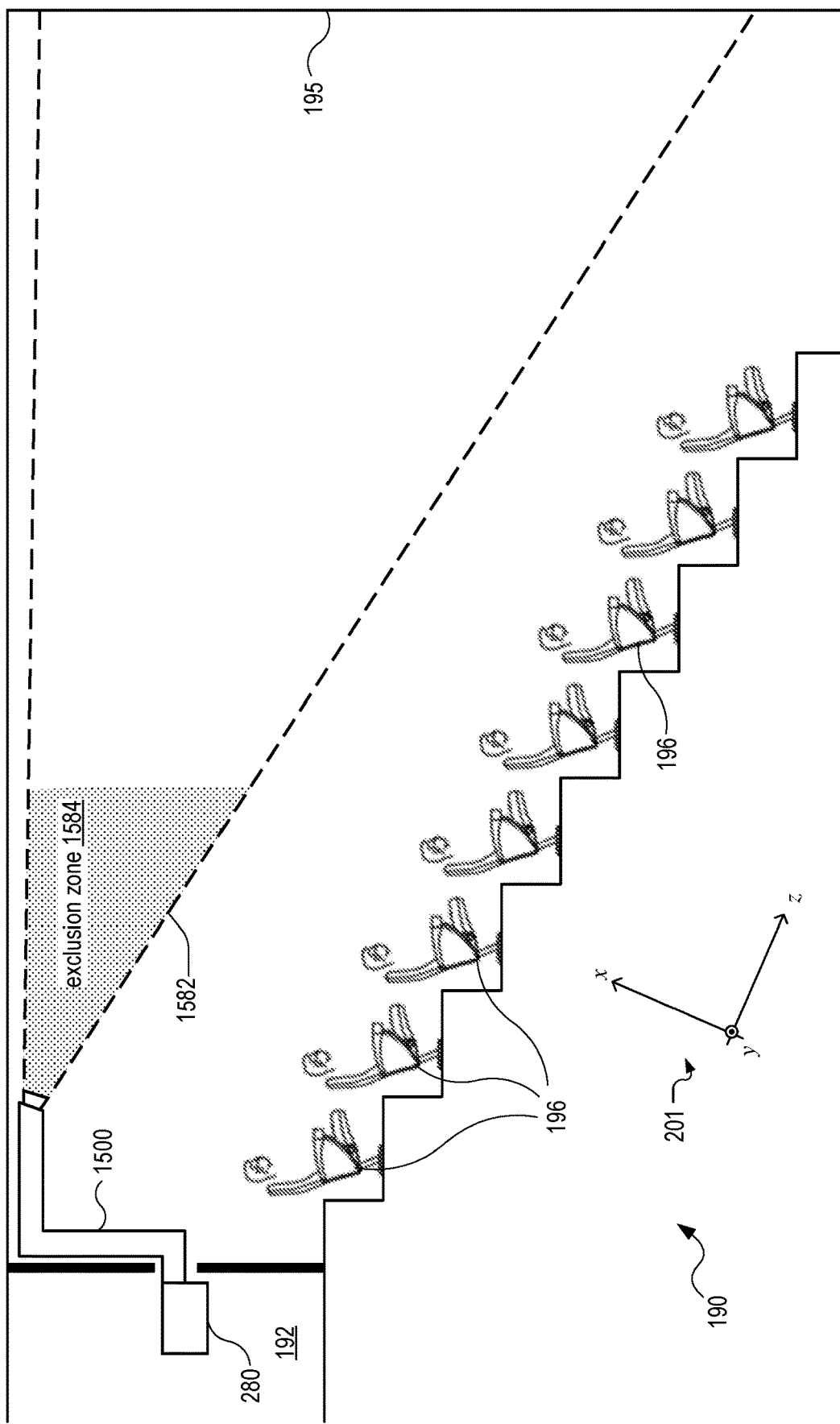
FIG. 15 is a side view of a second optical relay configured to redirect projector illumination from the projector of FIG. 2, in an embodiment.

FIG. 15 is a side view of projector 280 operating in theater 190, in which an optical relay 1500 is configured to redirect screen illumination 282, as redirected illumination 1582, away from seats 196 and toward screen 195, so as to increase the distance between seats 196 and an exclusion zone 1584, which is an example of exclusion zone 184. Optical relay 1500 is an example of optical relay 1400 and may include a periscope configured to redirect projector illumination away from seats 196 and toward screen 195.

Figure 16:
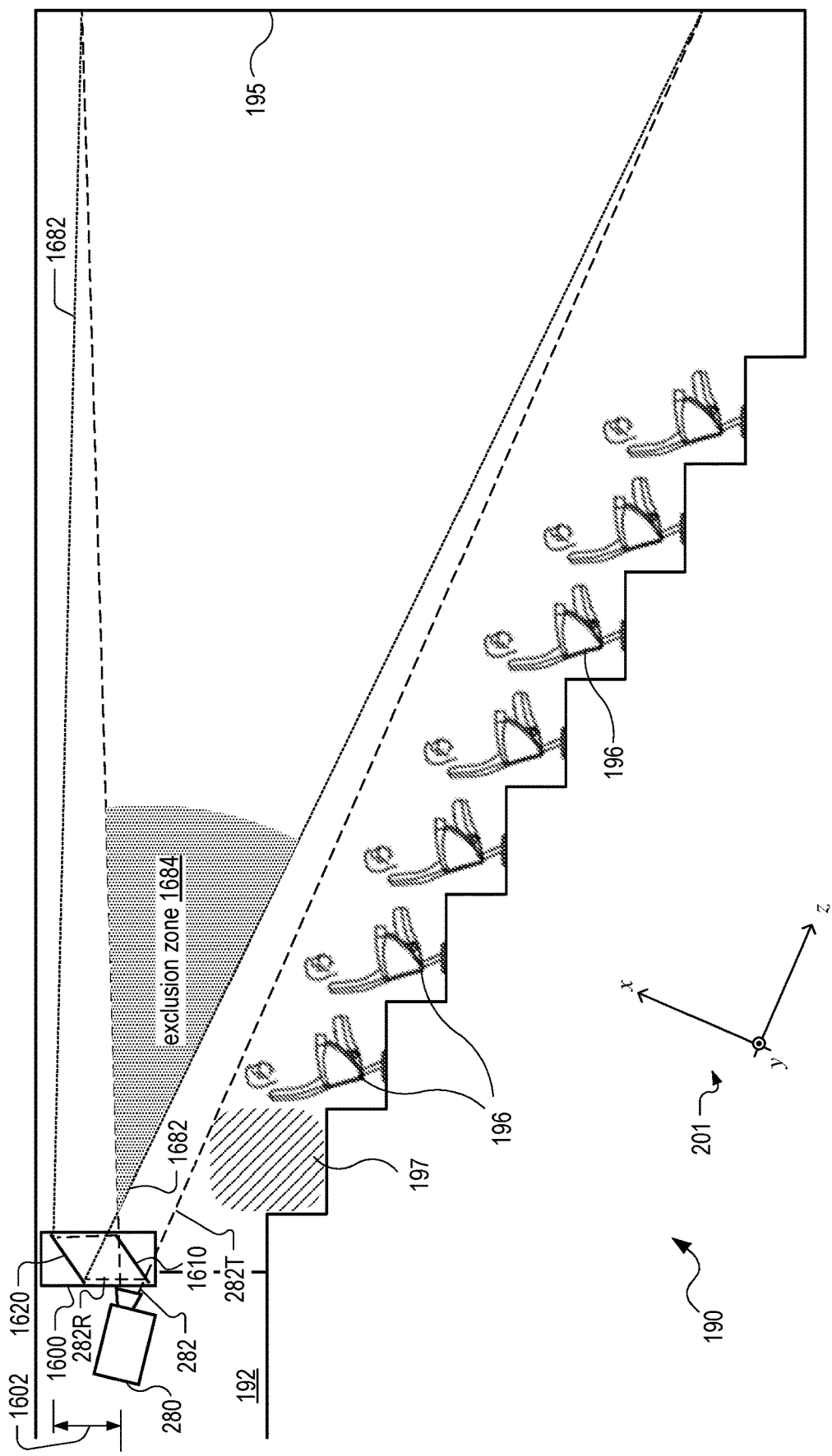
FIG. 16 is a side view of a partially-reflective optical relay configured to redirect projector illumination from the projector of FIG. 2, in an embodiment.

Each of optical relays 1400 and 1500 may include a partially-reflective mirror. FIG. 16 is a side view of projector 280 operating in theater 190, which in this example includes a partially-reflective optical relay 1600, optical relay 1600 is an example of optical relays 1400 and 1500. Optical relay 1600 is configured to redirect part of screen illumination 282, as redirected illumination 1682, away from seats 196 and toward screen 195. Partially-reflective optical relay 1600 may include a plurality of optical elements configured to function as a periscope. For example, optical relay 1600 includes a first mirror 1610 and a second mirror 1620. First mirror 1610 may be partially reflective such that it transmits parts of screen illumination 282, as transmitted illumination 282T, toward screen 195 while also reflecting part of screen illumination 282, illumination 282R, toward second mirror 1620, which reflects illumination 282R as redirected illumination 1682. First mirror 1610 may be a 50/50 beamsplitter such that, given one-hundred percent reflection by second mirror 1620, transmitted illumination 282T and redirected illumination 1682 have equal optical intensity. Alternatively, optical intensity of redirected illumination 1682 may exceed that of transmitted illumination 282T.

Partially-reflective optical relay 1600 may be configured, e.g., via spacing of mirrors 1610 and 1620, to vertically separate redirected illumination 1682 and transmitted illumination 282T by a distance 1602. Distance 1602 is, for example, between one centimeter and one meter. In an embodiment, partially-reflective optical relay 1600 is configured, e.g., via spacing of mirrors 1610 and 1620, to vertically and/or horizontally separate redirected illumination 1682 and transmitted illumination 282T.

FIG. 16 illustrates an exclusion zone 1684 in a region corresponding to where redirected illumination 1682 overlaps with transmitted illumination 282T. Absent optical relay 1600, exclusion zone 1684 would extend down toward seats 196, and hence be a hazard to audience members 198 seated therebeneath. One benefit of optical relay 1600 is to enhance eye safety, even when distance 1602 is sufficiently short (and/or has a component parallel to the x direction) such that exclusion zone 1684 extends below eye-level of viewer 198 when standing. Since redirected illumination 1682 and transmitted illumination 282T are spatially offset, respective high-intensity regions of redirected illumination 1682 and transmitted illumination 282T are also spatially offset. Hence, when projector 280 is projecting a non-uniform intensity image, the effective maximum intensity incident on a viewer's eye is decreased because of the spatial offset introduced by optical relay 1600.

Optical relay 1600 may also vertically-separate redirected illumination 1882 from transmitted illumination 282T such that exclusion zone 284 is sufficiently higher than eye-level of a standing viewer, e.g., any viewer 198 standing up from beneath exclusion zone 284. Distance 1602 may be at least partly determined by such an eye-level of a standing viewer, such as a viewer whose height exceeds a predetermined percentile in height. In such an embodiment, the optical intensity of redirected illumination 1682 may exceed that of transmitted illumination 282T.

Figure 17:
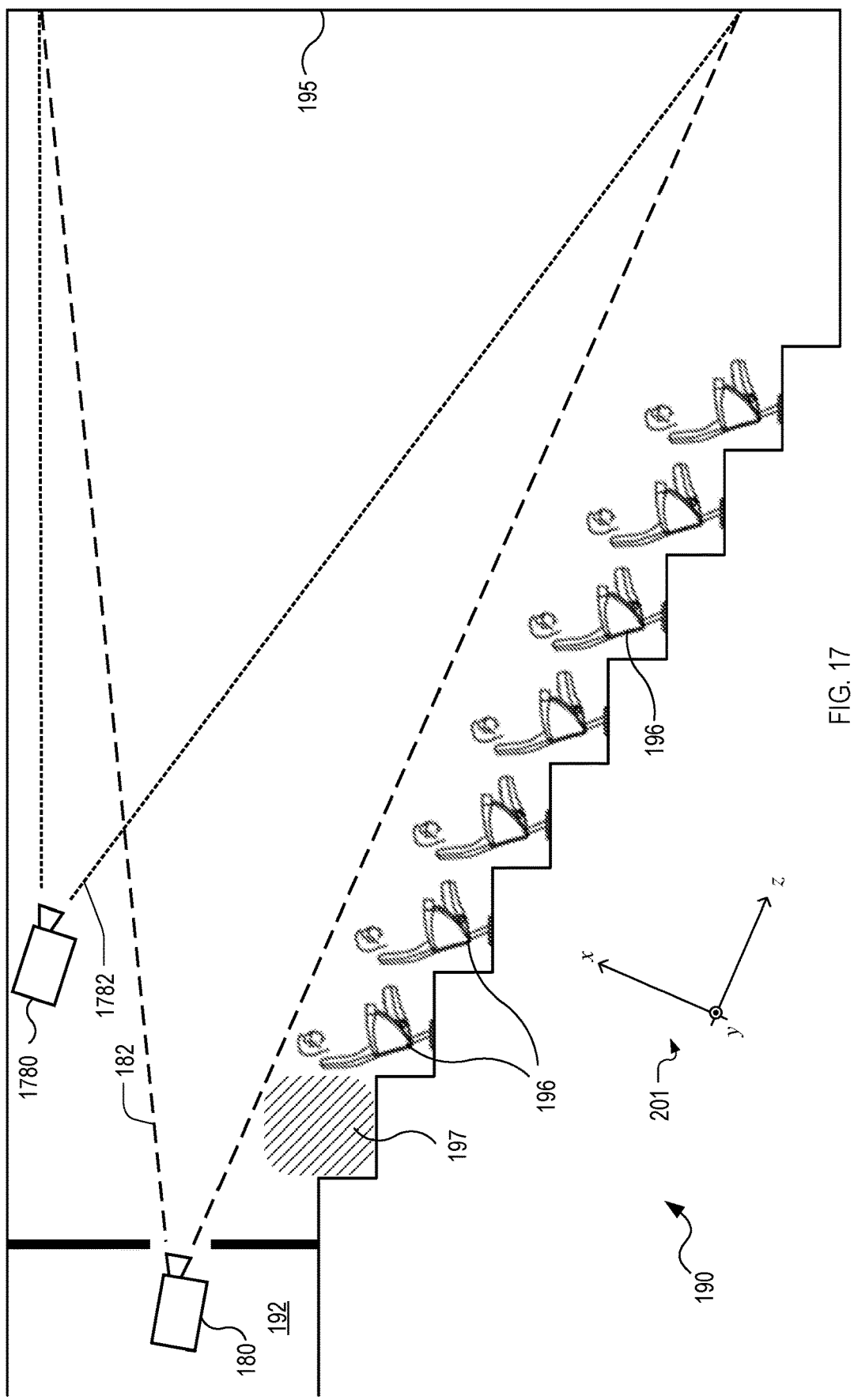
FIG. 17 is a side view of theater of FIG. 1 configured with a supplemental projector, in an embodiment.

FIG. 17 is a side view of theater 190 configured with both projector 180 and a supplemental projector 1780. Supplemental projector 1780 is projector 280, for example. Supplemental projector 1780 may be located outside of projection booth 192 and be configured to emit projector illumination 1782. The addition of supplemental projector 1780 enables rendering of a high-quality image, similar to that of a high-intensity (e.g., laser-based) projector, while maintaining a small exclusion zone associated with a low-intensity (e.g. non-laser) projector.

Projector illumination 1782 may correspond to the same video data as, and be time synchronous to, screen illumination 182. Alternatively, projector illumination 1782 may be complementary to screen illumination 182, for example, by including graphical overlay images and/or video, such as highlights. Supplemental projector 1780 may be aligned such that projector illumination 1782 is registered to screen illumination 182 on screen 195.

Figure 18:
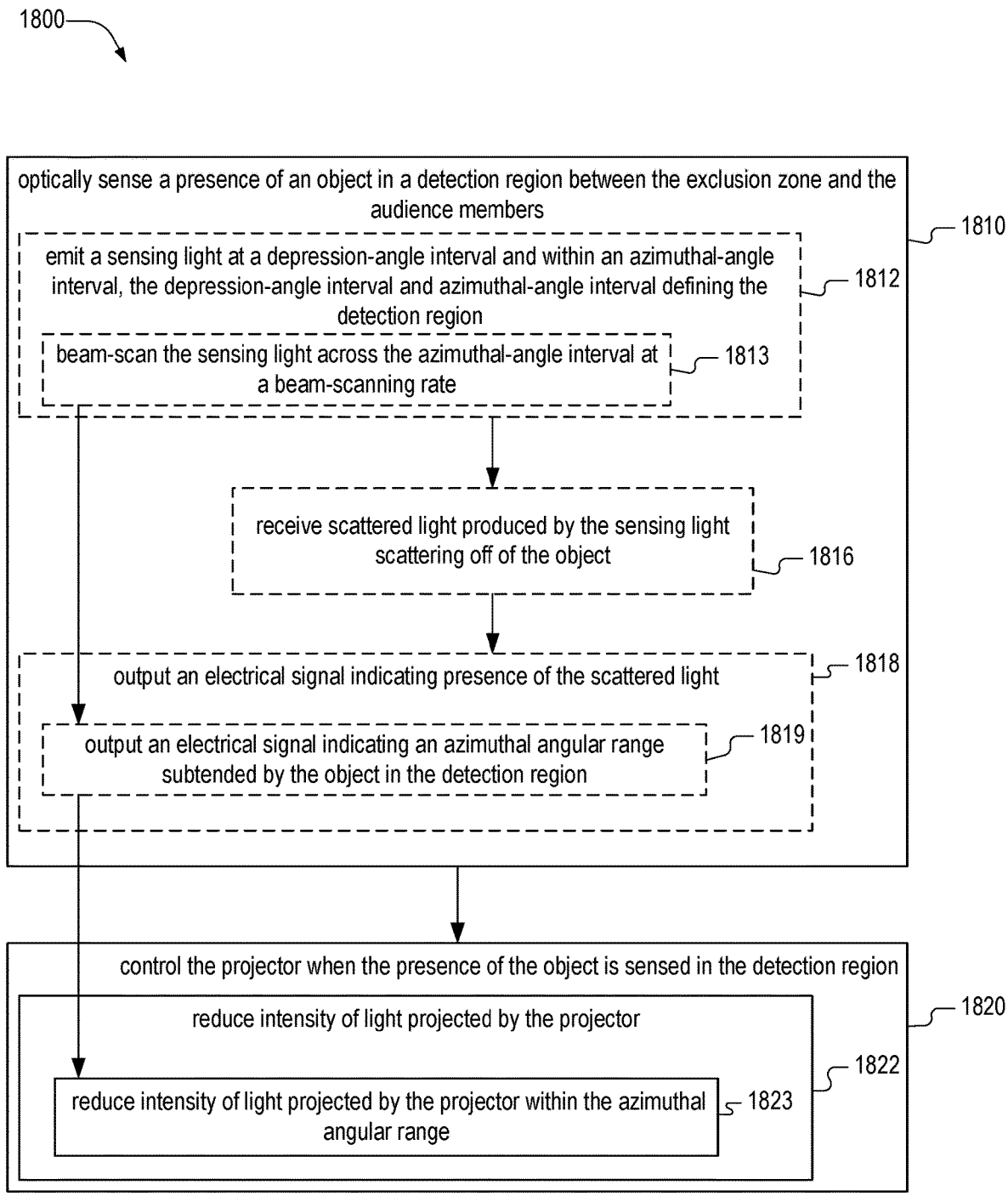
FIG. 18 is a flowchart illustrating a method for protecting audience members from intense light imposing an exclusion zone in front of a projector, in an embodiment.

FIG. 18 is a flowchart illustrating a method 1800 for protecting audience members from intense light, emitted from a projector, wherein the intense light imposes an exclusion zone in front of the projector. Method 1800 may be implemented by projection controller 200 and examples thereof described herein. Method 1800 includes at least one of steps 1810 and 1820.

Step 1810 includes optically sensing a presence of an object in a detection region between the exclusion zone and the audience members. In an example of step 1810, object detector 210 detects object 413 in detection region 286 between exclusion zone 184 and audience member 198. Step 1810 may include at least one of steps 1812, 1816, and 1818. Step 1812 may include step 1813, in which case step 1818 may also include step 1819.

Step 1812 includes emitting a sensing light at a depression-angle interval and within an azimuthal-angle interval, the depression-angle interval and azimuthal-angle interval defining the detection region. In an example of step 1812, object detector 210 emits light beam 230 at a fixed depression-angle interval and within azimuthal-angle interval 282D, where lower bound 230L and upper bound 230U define the depression-angle interval. Step 1813 includes beam-scanning the sensing light across the azimuthal-angle interval at a beam-scanning rate. In an example of step 1813, beam-steerer 740 scans light beam 630 across azimuthal angular interval 661 at a beam-scanning rate that exceeds a frame rate of projector 280.

Step 1816 includes receiving scattered light produced by the sensing light scattering off of the object. In an example of step 1816, optical receiver 714 receives scattered light 736 scattered by object 413.

Step 1818 includes outputting an electrical signal indicating presence of the scattered light. Step 1819 includes outputting an electrical signal indicating an azimuthal angular range subtended by the object in the detection region. In an example of step 1818, object detector 710 outputs a signal 738, FIG. 7.

Step 1820 includes controlling the projector when the presence of the object is sensed in the detection region. In an example of step 1820, projector controller 200 controls projector 280 when object detector 210 detects object 413 in detection region 286 and beneath or in exclusion zone 184. Step 1822 includes reducing the intensity of the light projected by the projector. In an example of step 1822, projector control 200 reduces intensity of screen illumination 282. When step 1818 includes step 1819, step 1822 may include step 1823, which includes reducing intensity of light projected by the projector within the azimuthal angular range of step 1819. In an example of step 1823, projector controller 700 reduces intensity of screen illumination 282 within azimuthal angular range 663.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A projector controller for protecting audience members from intense light imposing an exclusion zone in which light intensity may exceed an eye-safety threshold in front of a projector for emitting screen illumination onto a screen, comprising:

an object detector configured to optically sense a presence of an object in a detection region beneath the exclusion zone and above the audience members; and control electronics configured to control the projector when the object detector indicates the presence of the object in the detection region;

wherein the object detector comprises:

a light source configured to emit sensing light at a depression-angle interval and in an azimuthal-angle interval, the depression-angle interval and the azimuthal-angle interval defining the detection region, said light source comprising a pulsed laser emitting a pulsed sensing light;

an optical receiver configured to receive scattered light produced by the sensing light scattering off of the object; and localization electronics configured to receive an output of the optical receiver and generate a signal indicating presence of the scattered light on the optical receiver, the localization electronics configured to measure a time-of-flight between the pulsed sensing light and pulsed scattered light originating from scattering of the pulsed sensing light off of the object;

said control electronics being configured to control the projector by reducing intensity of light projected by the projector based on the measured time-of-flight when the time-of-flight corresponds to a distance between the object and the projector that is less than an exclusion range, wherein the distal end of the exclusion zone, beyond which the light intensity of the projector does not exceed said eye-safety threshold, is located at the exclusion range from the projector, said distal end being located between the projector and said screen.

2. The projector controller of claim 1, wherein, at the distal end of the exclusion zone, the intensity of light projected by the projector is between thirty and forty milliwatts per square centimeter.

3. The projector controller of claim 1, said reducing comprising at least one of:
  disabling the light source within the projector;
  shuttering output of the projector;
  disabling production of a highlight of an output image projected the projector; and
  limiting a maximum intensity of the output image.

4. The projector controller of claim 1, the object detector further configured to measure angles subtended by the physical object in the detection region, the control electronics configured to apply said reducing to a projection direction corresponding to the angles.

5. The projector controller of claim 1, the object detector further configured to measure position information for the object in the detection region, the control electronics configured to apply said reducing to a projection direction corresponding to the position information.

6. The projector controller of claim 1, the object detector operating at a wavelength not emitted by the projector.

7. The projector controller of claim 1, the object detector comprising:
  a light source configured to emit sensing light at a depression-angle interval and in an azimuthal-angle interval, the depression-angle interval and the azimuthal-angle interval defining the detection region;
  an optical receiver configured to receive scattered light produced by the sensing light scattering off of the object; and
  localization electronics configured to receive an output of the optical receiver and generate a signal indicating presence of the scattered light on the optical receiver.

8. The projector controller of claim 7, further comprising beam-steering components configured to scan the sensing light across the azimuthal-angle interval at a beam-scanning rate.

9. The projector controller of claim 7, the object detector configured to measure an azimuthal angular range subtended by the object in the detection region.

10. The projector controller of claim 9, the control electronics configured to control the projector by reducing intensity of light projected by the projector within the azimuthal angular range.

11. The projector controller of claim 7, the localization electronics configured to measure an azimuthal angle, within the azimuthal-angle interval, at which the object is sensed in the detection region.

12. The projector controller of claim 11, the control electronics configured to control the projector by reducing intensity of light projected by the projector at the azimuthal angle.

13. The projector controller of claim 7, the light source comprising an infrared light source or a visible light source.

14. The projector controller of claim 7, the optical receiver comprising a position-sensitive detector and a lens assembly, positioned and oriented to measure a position of the scattered light on the position-sensitive detector.

15. The projector controller of claim 14, the position-sensitive detector comprising a photodetector array.

16. The projector controller of claim 14, the localization electronics configured to process the position of the scattered light on the position-sensitive detector to triangulate position information for the object, the position information including at least an azimuthal angle, within the azimuthal-angle interval, of the object in the detection region.

17. The projector controller of claim 16, the control electronics configured to dim output of the projector in a direction determined by the azimuthal angle.

18. A projector system, comprising:
  the projector controller of claim 1; and
  the projector.

19. A method for protecting audience members from light emitted by a projector onto a screen, comprising:
  optically sensing a presence of an object in a detection region between an exclusion zone, in which light intensity may exceed an eye-safety threshold, and the audience members, the exclusion zone being above the audience members and within the emitted light; and
  controlling the projector when the presence of the object is sensed in the detection region;
  wherein said optically sensing a presence of an object comprises
    emitting, using a light source configured to emit sensing light, pulsed sensing light at a depression-angle interval and in an azimuthal-angle interval, the depression-angle interval and the azimuthal-angle interval defining the detection region;
    receiving, using an optical receiver, scattered light produced by the sensing light scattering off of the object; and
    receiving an output of the optical receiver and generate a signal indicating presence of the scattered light on the optical receiver by measuring a time-of-flight between the pulsed sensing light and pulsed scattered light originating from scattering of the pulsed sensing light off of the object;
  wherein said controlling the projector comprises reducing intensity of light projected by the projector based on the measured time-of-flight when the time-of-flight corresponds to a distance between the object and the projector that is less than an exclusion range, wherein the distal end of the exclusion zone, beyond which the light intensity of the projector does not exceed said eye-safety threshold, is located at the exclusion range from the projector, said distal end being located between the projector and said screen.

20. The method of claim 19, wherein, at the distal end of the exclusion zone, the intensity of light projected by the projector is between thirty and forty milliwatts per square centimeter.

21. The method of claim 19, emitting comprising beam-scanning the sensing light across the azimuthal-angle interval at a beam-scanning rate.

22. The method of claim 21, optically sensing further comprising outputting an electrical signal indicating an azimuthal angular range subtended by the object in the detection region.

23. The method of claim 22, controlling comprising reducing intensity of light projected by the projector within the azimuthal angular range.

* * * * *